US012737510B2

(12) United States Patent
Ueno

(10) Patent No.: US 12,737,510 B2
(45) Date of Patent: Sep. 15, 2026

(54) METHOD OF DESIGNING AN AIRCRAFT SHAPE OF A SUPERSONIC AIRCRAFT, METHOD OF PRODUCING A SUPERSONIC AIRCRAFT, AND SUPERSONIC AIRCRAFT

(71) Applicant: JAPAN AEROSPACE EXPLORATION AGENCY, Tokyo (JP)

(72) Inventor: Atsushi Ueno, Tokyo (JP)

(73) Assignee: Japan Aerospace Exploration Agency, Tokyo (JP)

(*) Notice: Subject to any disclaimer, the term of this patent is extended or adjusted under 35 U.S.C. 154(b) by 1052 days.

(21) Appl. No.: 17/905,311

(22) PCT Filed: Feb. 5, 2021

(86) PCT No.: PCT/JP2021/004341
§ 371 (c)(1),
(2) Date: Aug. 30, 2022

(87) PCT Pub. No.: WO2021/186940
PCT Pub. Date: Sep. 23, 2021

(65) Prior Publication Data

US 2023/0130658 A1 Apr. 27, 2023

(30) Foreign Application Priority Data

Mar. 16, 2020 (JP) ................................. 2020-045245

(51) Int. Cl.
*G06F 30/15* (2020.01)
*B64C 30/00* (2006.01)
*G06F 113/28* (2020.01)

(52) U.S. Cl.
CPC ............. *G06F 30/15* (2020.01); *B64C 30/00* (2013.01); *G06F 2113/28* (2020.01)

(58) Field of Classification Search
CPC ....... G06F 30/15; G06F 2113/28; B64C 30/00
See application file for complete search history.

(56) References Cited

U.S. PATENT DOCUMENTS 8,473,254 B2 * 6/2013 Morgenstern ......... B64C 1/0009 703/1
2005/0218267 A1 * 10/2005 Makino .................. B64C 30/00 244/130

(Continued)

FOREIGN PATENT DOCUMENTS

JP 5057374 B2 10/2012
WO 2019/187828 A1 10/2019

OTHER PUBLICATIONS

Supplementary European Search Report dated Feb. 9, 2024 in European Application No. 21770772.8.

(Continued)

*Primary Examiner* — Kibrom K Gebresilassie
(74) *Attorney, Agent, or Firm* — SALIWANCHIK, LLOYD & EISENSCHENK

(57) ABSTRACT

A method of designing an aircraft shape of a supersonic aircraft according to an embodiment of the present invention includes: obtaining an equivalent cross-sectional area distribution of an initial shape at an off-track position of an aircraft; setting a target equivalent cross-sectional area distribution at the off-track position of the aircraft for reducing sonic booms on the basis of the obtained equivalent cross-sectional area distribution; and converting, on the basis of a required additional cross-sectional area distribution that is a difference between the equivalent cross-sectional area distribution and the target equivalent cross-sectional area distribution, a required additional cross-sectional area of a cross-section of the aircraft on an off-track Mach plane that extends through an arbitrary position in an airflow direction into a required additional cross-sectional area of a cross- (Continued)

section of the aircraft on an on-track Mach plane of the aircraft that is located near the off-track Mach plane and adding the required additional cross-sectional area of the cross-section of the aircraft on the on-track Mach plane.

10 Claims, 20 Drawing Sheets

(56) References Cited

U.S. PATENT DOCUMENTS

| | | | | |
|---|---|---|---|---|
| 2005/0230531 | A1 * | 10/2005 | Horinouchi | B64C 3/10 244/47 |
| 2008/0105783 | A1 | 5/2008 | Laflin | |

OTHER PUBLICATIONS

Office Action dated Jul. 7, 2025 in European Application No. 21770772.8.
Office Action dated Mar. 31, 2023 in Japanese Application No. 2022-508123.
International Search Report dated Apr. 27, 2021 in International Application No. PCT/JP2021/004341.
Darden, C. M., “Sonic-Boom Minimization With Nose-Bluntness Relaxation,” NASA Technical Paper 1348, Jan. 1979, pp. 1-58.
Magee, T. E. et al., “System-Level Experimental Validations for Supersonic Commercial Transport Aircraft Entering Service in the 2018-2020 Time Period,” NASA, Feb. 2013, pp. 1-36.
Morgenstern, J. et al., “Advanced Concept Studies for Supersonic Commercial Transports Entering Service in the 2018 to 2020 Period,” NASA, Feb. 13, pp. 1-17.
Li, W. et al., “Inverse Design of Low-Boom Supersonic Concepts Using Reversed Equivalent-Area Targets,” Journal of Aircraft, Jan.-Feb. 2014, 51(1):29-36.
Ordaz, I. et al., “Full-Carpet Design of a Low-Boom Demonstrator Concept,” AIAA Aviation Forum, Jun. 22-26, 2015, pp. 1-15.
Ueno, A. et al., “Robust Low-Boom Design Based on Near-Field Pressure Signature in Whole Boom Carpet,” Journal of Aircraft, 2016, pp. 1-8.
Ueno, A. et al., “Robust Low-Boom Design in Primary Boom Carpet,” AIAA 2021-1270, Jan. 4, 2021, [online], [retrieved on Apr. 15, 2021]. Retrieved from <https://doi.org/10.2514/6.2021-1270> abstract.

* cited by examiner

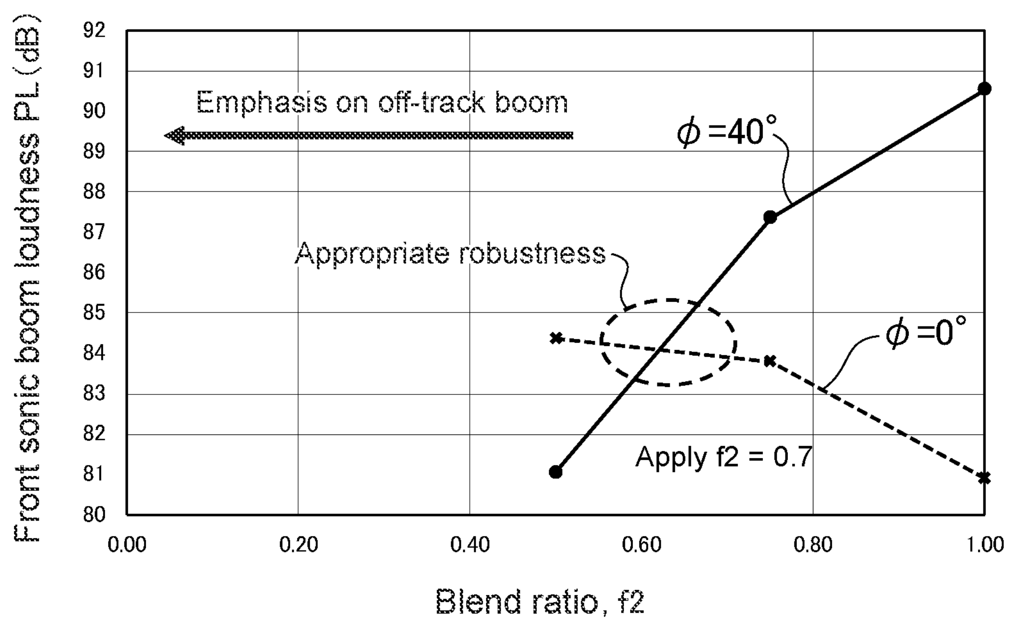
FIG.21
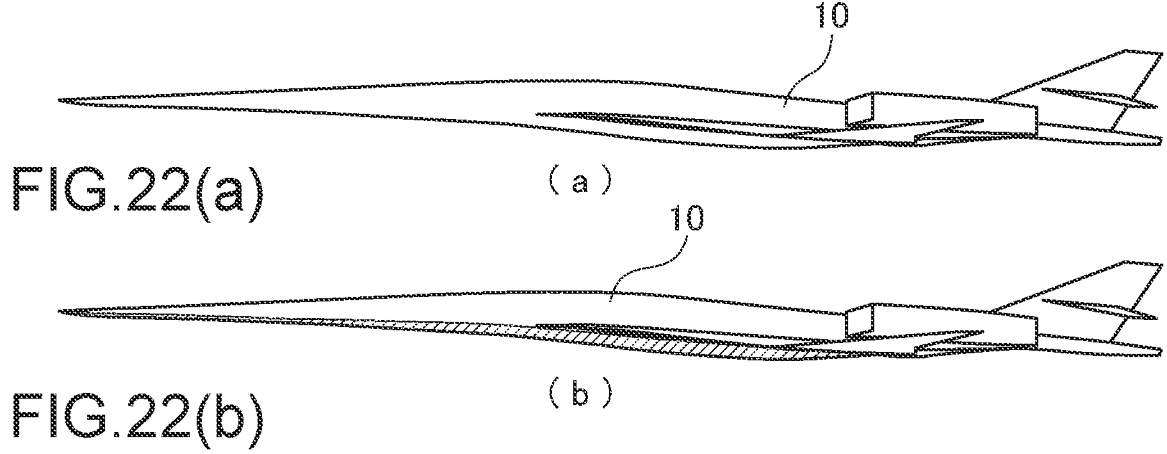
FIG.22(a)
FIG.22(b)

Equivalent cross-sectional area distribution

Mach plane extending through x = X

Aircraft

Initial cross-sectional shape

Design target cross-sectional shape (Cross-sectional area＝Ae)

Modified cross-sectional shape

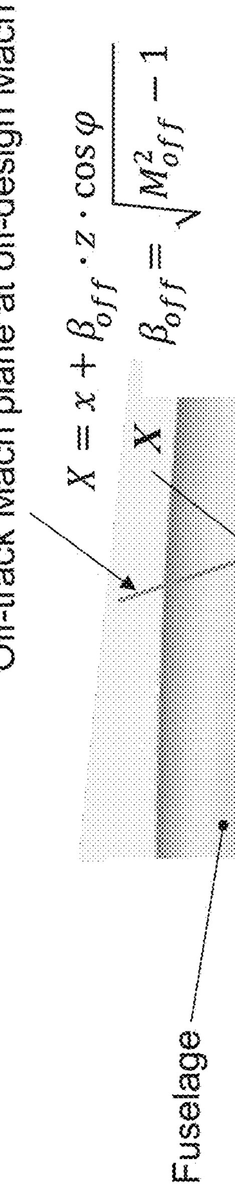

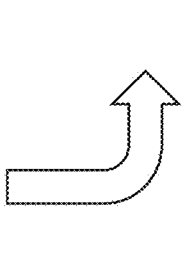

On-track Mach plane at design Mach number (intersection line B)

$X' = x + \beta \cdot z$ $\beta = \sqrt{M^2 - 1}$ x

Reference line $z = -\tan(\alpha) \cdot x$

X'

Rotated intersection point $$X - X' = \frac{1 - \cos d\alpha - \beta \cdot \sin d\alpha - \tan(\alpha + d\alpha) \cdot B}{A} X$$

$$A = 1 - \beta_{off} \cdot \cos\varphi \cdot \tan(\alpha + d\alpha)$$

$$B = \beta_{off} \cdot \cos\varphi + \sin d\alpha - \beta \cdot \cos d\alpha$$

FIG.27

Circumferential robust (first embodiment)

Mach number and circumferential robust (second embodiment)

METHOD OF DESIGNING AN AIRCRAFT SHAPE OF A SUPERSONIC AIRCRAFT, METHOD OF PRODUCING A SUPERSONIC AIRCRAFT, AND SUPERSONIC AIRCRAFT

CROSS-REFERENCE TO RELATED APPLICATIONS

This application is the U.S. national stage application of International Patent Application No. PCT/JP2021/004341, filed Feb. 5, 2021, which claims the benefit under 35 U.S.C. § 119 of Japanese Application No. 2020-045245, filed Mar. 16, 2020, the disclosures of each of which are incorporated herein by reference in their entirety.

TECHNICAL FIELD

The present technology relates to a method of designing an aircraft shape of a supersonic aircraft, a method of producing a supersonic aircraft, and a supersonic aircraft that reduce sonic booms.

BACKGROUND ART

Several technologies have been proposed to reduce sonic booms by designing the aircraft shape.

Non-Patent Literature 1 is a technology for calculating an equivalent cross-sectional area distribution (sum of a cross-sectional area of the aircraft and a cross-sectional area equivalent to lift) for reducing sonic booms with respect to the design conditions of the aircraft (e.g., aircraft length, aircraft weight, flight Mach number, flight altitude), and in Non-Patent Literature 2 and Non-Patent Literature 3, a specific aircraft shape is designed using the technology of Non-Patent Literature 1.

In Non-Patent Literature 4, it is shown that a more accurate low sonic boom aircraft shape design is possible by using a reversed equivalent cross-sectional area distribution calculated from a pressure signature near the aircraft instead of the equivalent cross-sectional area distribution of the aircraft.

In Patent Literature 1, a low sonic boom aircraft shape design for a position directly below the aircraft (hereinafter referred to as "on-track position") is efficiently made using the technology of Non-Patent Literature 1 and the reversed equivalent cross-sectional area distribution of Non-Patent Literature 4.

The low sonic boom aircraft shape concepts proposed in Patent Literature 2 have been applied to experimental aircraft and tested.

In Non-Patent Literature 5, they have studied an aircraft shape design method that simultaneously reduces on-track sonic booms and sonic booms at a position deviating from the position directly below the aircraft in the circumferential direction (hereinafter referred to as "off-track position"). Since the off-track sonic boom loudness increases when sonic booms are reduced considering only on-track sonic booms, the importance of a low boom design that is robust in the circumferential direction has been pointed out.

In Non-Patent Literature 6, a low sonic boom aircraft shape design that is robust in the circumferential direction is made using free form deformation.

CITATION LIST

Patent Literature

Patent Literature 1: WO2019/187828

Patent Literature 2: Japanese Patent No. 5057374

Non-Patent Literature

Non-Patent Literature 1: Christine M. Darden: Sonic-Boom Minimization With Nose-Bluntness Relaxation, NASA TP-1348, 1979.

Non-Patent Literature 2: Todd E. Magee, Peter A. Wilcox, Spencer R. Fugal, and Kurt E. Acheson, Eric E. Adamson, Alicia L. Bidwell, and Stephen G. Shaw: System-Level Experimental Validations for Supersonic Commercial Transport Aircraft Entering Service in the 2018-2020 Time Period Phase I Final Report, NASA/CR-2013-217797, 2013.

Non-Patent Literature 3: John Morgenstern, Nicole Norstrud, Jack Sokhey, Steve Martens, and Juan J. Alonso: Advanced Concept Studies for Supersonic Commercial Transports Entering Service in the 2018 to 2020 Period Phase I Final Report, NASA/CR-2013-217820, 2013.

Non-Patent Literature 4: Wu Li, Sriram K. Rallabhandi: Inverse Design of Low-Boom Supersonic Concepts Using Reversed Equivalent-Area Targets, Journal of Aircraft, Vol. 51, No. 1, 2014.

Non-Patent Literature 5: Irian Ordaz, Mathias Wintzer, Sriram K. Rallabhandi: Full-Carpet Design of a Low-Boom Demonstrator Concept, AIAA 2015-2261, 2015.

Non-Patent Literature 6: Atsushi Ueno, Masashi Kanamori, Yoshikazu Makino: Robust Low-Boom Design Based on Near-Field Pressure Signature in Whole Boom Carpet, Journal of Aircraft, Vol. 54, No. 3, 2017.

DISCLOSURE OF INVENTION

Technical Problem

The off-track sonic boom reduction can be achieved by applying the technology of Non-Patent Literature 1 to match the equivalent cross-sectional area distribution at the off-track position of the aircraft to the equivalent cross-sectional area distribution of the aircraft that can realize sonic boom reduction (hereinafter referred to as "target equivalent cross-sectional area distribution"). However, as to the off-track position, the cross-sectional shape (intersection line between the Mach plane and the aircraft) for calculating the equivalent cross-sectional area of the aircraft is non-symmetrical. By arbitrarily deforming the aircraft using the free form deformation shown in Non-Patent Literature 6, a symmetrical aircraft shape matching the target equivalent cross-sectional area distribution can be designed. However, for this purpose, it is necessary to determine the position of a control point constituting a control BOX surrounding a deformation target part of the aircraft by a design optimization method, and there is a problem in efficient aircraft shape design.

In order to design a low sonic boom aircraft shape that is robust in the circumferential direction, a plurality of equivalent cross-sectional area distributions at the on-track and off-track positions of the aircraft have to be simultaneously matched to the target equivalent cross-sectional area distribution at each of the on-track and off-track positions. However, there may not exist an aircraft shape that realizes this. That is, there is a problem in setting a realizable target equivalent cross-sectional area distribution that is robust in the circumferential direction.

In view of the above-mentioned circumstances, it is an objective of the present invention to provide a method of designing an aircraft shape of a supersonic aircraft, a method of producing a supersonic aircraft, and a supersonic aircraft that are capable of efficiently designing a low sonic boom aircraft shape without using an design optimization method.

It is another objective of the present invention to provide a method of designing an aircraft shape of a supersonic aircraft, a method of producing a supersonic aircraft, and a supersonic aircraft that are capable of efficiently designing a low sonic boom aircraft shape that is robust in the circumferential direction.

Solution to Problem

In order to accomplish the above-mentioned objectives, a method of designing an aircraft shape of a supersonic aircraft according to an embodiment of the present invention includes:

- obtaining an equivalent cross-sectional area distribution of an initial shape at an off-track position of an aircraft;
- setting a target equivalent cross-sectional area distribution at the off-track position of the aircraft for reducing sonic booms on the basis of the equivalent cross-sectional area distribution; and
- converting, on the basis of a required additional cross-sectional area distribution that is a difference between the equivalent cross-sectional area distribution and the target equivalent cross-sectional area distribution, a required additional cross-sectional area of a cross-section of the aircraft on an off-track Mach plane that extends through an arbitrary position in an airflow direction into a required additional cross-sectional area of a cross-section of the aircraft on an on-track Mach plane that is located near the off-track Mach plane and adding the required additional cross-sectional area of the cross-section of the aircraft on the on-track Mach plane.

In the present invention, it is possible to realize an aircraft shape design considering low sonic boom properties at the off-track position only by using numerical values related to the on-track position where the cross-sectional shape for calculating the equivalent cross-sectional area of the aircraft is symmetrical, and the problem of left-right non-symmetry is solved. Accordingly, it is possible to efficiently design a low sonic boom aircraft shape without using an design optimization method.

The method of designing an aircraft shape of a supersonic aircraft according to the embodiment of the present invention further includes changing a blend ratio of a third distribution that blends the required additional cross-sectional area distribution for reducing sonic booms at the off-track position and a second required additional cross-sectional area distribution for reducing on-track sonic booms, evaluating on-track sonic boom loudness and off-track sonic boom loudness for each blend ratio, and setting the blend ratio on the basis of a result of the evaluation.

In the present invention, the plurality of target equivalent cross-sectional area distributions for the off-track and on-track positions is replaced by a single, i.e., realizable target equivalent cross-sectional area distribution for the on-track position, taking into account the robustness in the circumferential direction. Accordingly, it is possible to efficiently design a low sonic boom aircraft shape that is robust in the circumferential direction.

In the method of designing an aircraft shape of a supersonic aircraft according to the embodiment of the present invention, an axis extending from a starting point that is a nose tip of the aircraft, which is an axis tilted by an arbitrary angle with respect to the airflow direction so as to be in proximity to a design target site, is set as a reference line, and the on-track Mach plane of the aircraft located near the off-track Mach plane is set as the on-track Mach plane that extends through an intersection point of the off-track Mach plane and the reference line.

In the method of designing an aircraft shape of a supersonic aircraft according to the embodiment of the present invention, the reference line is an aircraft axis.

In the method of designing an aircraft shape of a supersonic aircraft according to the embodiment of the present invention, the step of converting the required additional cross-sectional area of the cross-section of the aircraft on the off-track Mach plane into the required additional cross-sectional area of the cross-section of the aircraft on the on-track Mach plane includes converting the required additional cross-sectional area of the cross-section of the aircraft on the off-track Mach plane at a design Mach number into the required additional cross-sectional area of the cross-section of the aircraft on the on-track Mach plane at a design Mach number.

In the method of designing an aircraft shape of a supersonic aircraft according to another embodiment of the present invention, the step of converting the required additional cross-sectional area of the cross-section of the aircraft on the off-track Mach plane into the required additional cross-sectional area of the cross-section of the aircraft on the on-track Mach plane includes converting the required additional cross-sectional area of the cross-section of the aircraft on the off-track Mach plane at an off-design Mach number into the required additional cross-sectional area of the cross-section of the aircraft on the on-track Mach plane at a design Mach number.

Accordingly, it is possible to realize a low boom design that is robust to the Mach number in addition to the low boom design that is robust in the circumferential direction.

In the method of designing an aircraft shape of a supersonic aircraft according to the other embodiment of the present invention, the aircraft has a nose tip, an axis extending from a starting point that is the nose tip of the aircraft, which is an axis tilted by an arbitrary angle with respect to the airflow direction so as to be in proximity to a design target site, is set as a reference line, an intersection point of the off-track Mach plane at the off-design Mach number and the reference line at the off-design Mach number is calculated, the intersection point is rotated to be on the reference line at the design Mach number, using the nose tip as a center, and the on-track Mach plane at the design Mach number that extends through the rotated intersection point is set.

In the method of designing an aircraft shape of a supersonic aircraft according to the other embodiment of the present invention, provided that the airflow direction is denoted by x, an x position on the off-track Mach plane at the off-design Mach number is denoted by X, a direction perpendicular to the airflow is denoted by z, an angle formed by the airflow direction and a direction of the reference line is denoted by $\alpha$, an angle of rotation of the intersection point is denoted by $d\alpha$, an x position on the on-track Mach plane at the design Mach number that extends through the rotated intersection point is denoted by X', the off-design Mach number is denoted by $M_{off}$, an off-track angle is denoted by φ ((0 degrees≤φ≤50 degrees), and $\beta_{off}=\sqrt{(M^2_{off}-1)}$ is established, the following relations are satisfied:

$$X = x + \beta_{off} \cdot z \cdot \cos\varphi;$$

$$\beta_{off} = \sqrt{(M_{off}^2 - 1)}; \text{ and}$$

$$z = -\tan(\alpha + d\alpha) \cdot x.$$

A method of producing a supersonic aircraft according to another embodiment of the present invention includes:

designing a supersonic aircraft by using the method of designing an aircraft shape of a supersonic aircraft according to any one of claims 1 to 8; and manufacturing a supersonic aircraft having an aircraft shape based on a result of the design.

A supersonic aircraft according to an embodiment of the present invention has a shape of an aircraft, for which:

an equivalent cross-sectional area distribution of an initial shape at an off-track position of an aircraft is obtained;

a target equivalent cross-sectional area distribution at the off-track position of the aircraft for reducing sonic booms is set on the basis of the equivalent cross-sectional area distribution; and on the basis of a required additional cross-sectional area distribution that is a difference between the equivalent cross-sectional area distribution and the target equivalent cross-sectional area distribution, a required additional cross-sectional area of a cross-section of the aircraft on an off-track Mach plane that extends through an arbitrary position in an airflow direction is converted into a required additional cross-sectional area of a cross-section of the aircraft on an on-track Mach plane that is located near the off-track Mach plane and the required additional cross-sectional area of the cross-section of the aircraft on the on-track Mach plane is added.

The supersonic aircraft according to the embodiment of the present invention further has a shape of an aircraft, for which a blend ratio of a third distribution that blends the required additional cross-sectional area distribution for reducing sonic booms at the off-track position and a second required additional cross-sectional area distribution for reducing on-track sonic booms is changed, on-track sonic boom loudness and off-track sonic boom loudness are evaluated for each blend ratio, and the blend ratio is set on the basis of a result of the evaluation.

Advantageous Effects of Invention

According to the present invention, a low sonic boom aircraft shape can be efficiently designed without using an design optimization method. In addition, it is possible to efficiently design a low sonic boom aircraft shape that is robust in the circumferential direction.

BRIEF DESCRIPTION OF DRAWINGS

FIG. 21 A diagram showing sonic boom loudness prediction using the equivalent cross-sectional area distribution in Example 1 according to the present invention, which shows a value of the front sonic boom loudness depending on the blend ratio at on-track and off-track positions (off-track angle=40 degrees).

FIGS. 22(*a*) and 22(*b*) A side view showing an aircraft shape in Example 1 according to the present invention, where FIG. 22(*a*) shows an initial shape and FIG. 22(*b*) shows a robust low boom shape in which the required additional cross-sectional area is added to the initial shape.

FIG. 27 A diagram for describing the "conversion" according to the second embodiment of the present invention in detail.

MODE(S) FOR CARRYING OUT THE INVENTION

Hereinafter, embodiments of the present invention will be described with reference to the drawings.

First Embodiment

Figure 1:
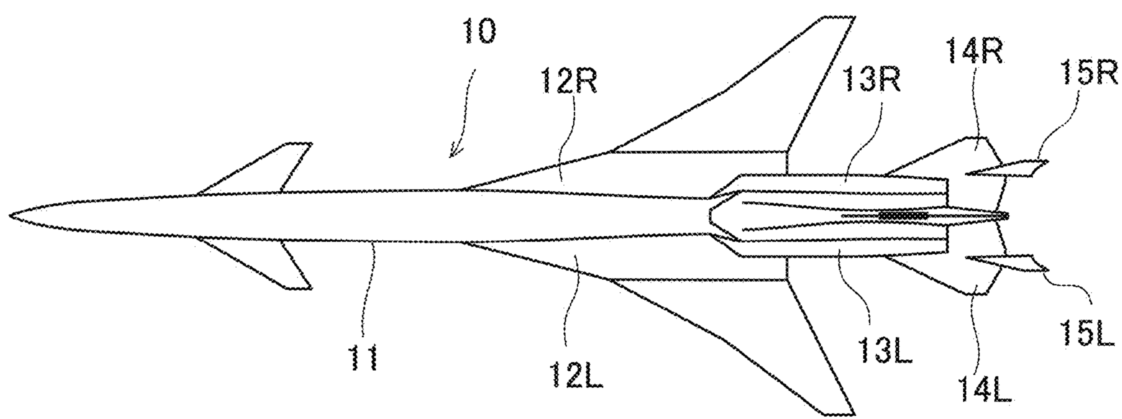
FIG. 1 A plan view showing the shape of a supersonic aircraft according to an embodiment of the present invention.
Figure 2:
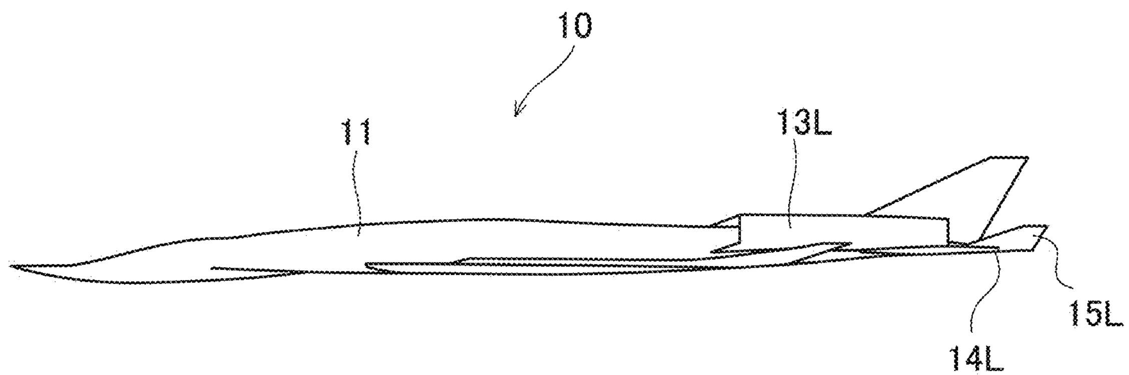
FIG. 2 A side view of the supersonic aircraft shown in FIG. 1.
Figure 3:
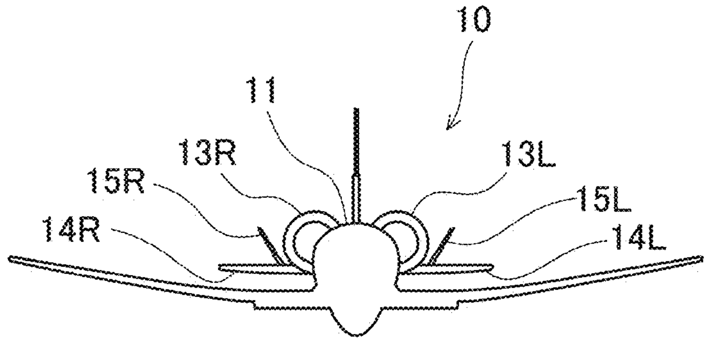
FIG. 3 A front view of the supersonic aircraft shown in FIG. 1.

FIG. 1 is a plan view showing the appearance of a supersonic aircraft according to an embodiment of the present invention, FIG. 2 is a side view thereof, and FIG. 3 is a front view thereof.

As shown in these figures, the supersonic aircraft according to this embodiment is provided with a pair of main wings 12R, 12L, a pair of engine nacelles 13R, 13L, and a pair of horizontal tails 14R, 14L on a fuselage 11 of an aircraft 10. Fins 15R and 15L are provided on the pair of horizontal tails 14R, 14L, respectively.

Figure 4:
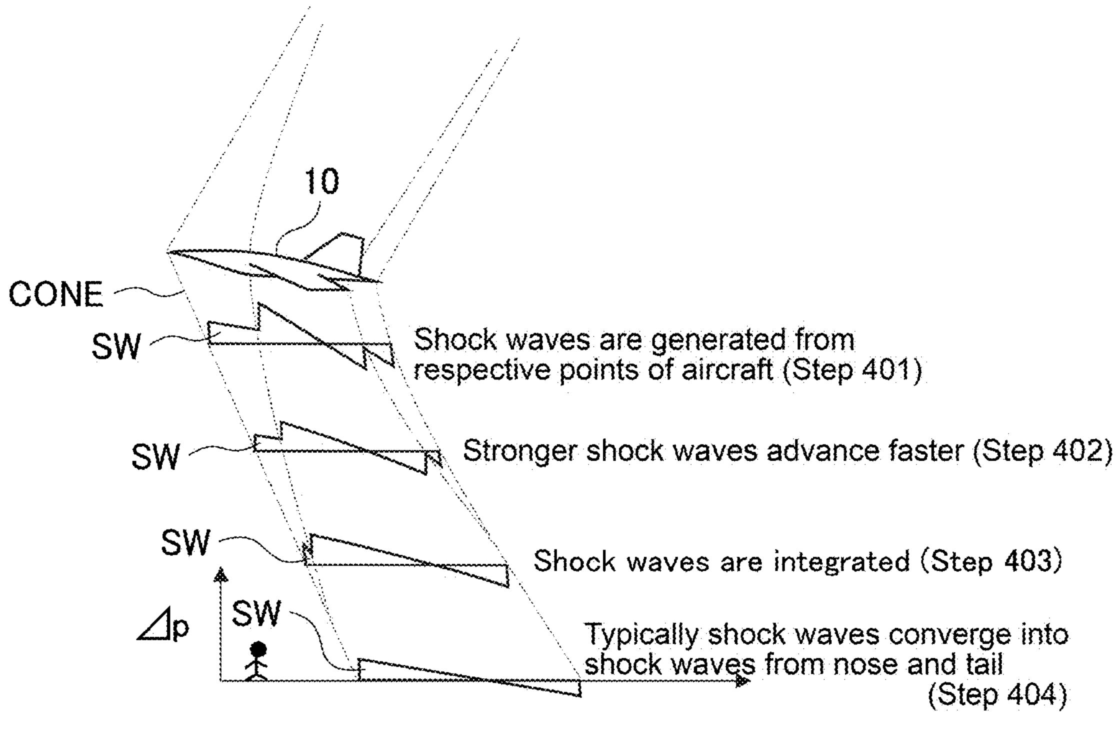
FIG. 4 A diagram for describing a situation where sonic booms are produced.
Figure 5:
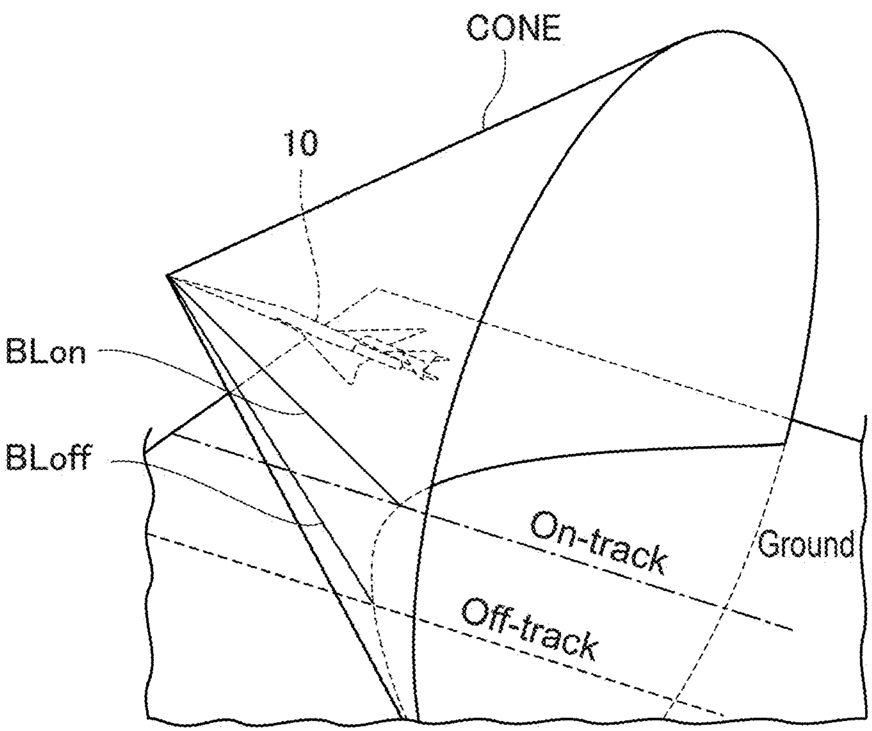
FIG. 5 A perspective view for describing an image of propagation of sonic booms.

As to such a supersonic aircraft, shock waves SW are generated from the respective points of the aircraft 10 as shown in FIG. 4 during supersonic flight (Step 401). Waves with a larger pressure fluctuation propagate in the atmosphere faster in a process of propagating through the atmosphere (Step 402), are integrated into two strong shock waves SW from the nose and the tail (Step 403), and are observed as a N-type pressure signature that has two sudden pressure rises on the ground (Step 404). The shock waves SW generated and propagated by the supersonic aircraft propagate in a conical form CONE and reach the ground as shown in FIG. 5. The CONE in the conical form is sometimes called Mach cone. On the ground, the shock waves SW that have reached there are observed as sonic booms.

The invention according to Patent Literature 1 sets an initial shape of the aircraft 10 and a target equivalent cross-sectional area of the aircraft 10, and estimates a near-field pressure signature for the initial shape of the aircraft 10, assuming that the supersonic aircraft flew at a cruise speed. Next, the equivalent cross-sectional area is evaluated from this near-field pressure signature, a Mach plane depending on the cruise speed is set, and a design curve corresponding to an initial curve where the initial shape of the aircraft 10 intersects the Mach plane is set on the Mach plane so that the equivalent cross-sectional area becomes close to the target equivalent cross-sectional area. Then, the shape of the aircraft 10 is designed based on this design curve.

Figure 6:
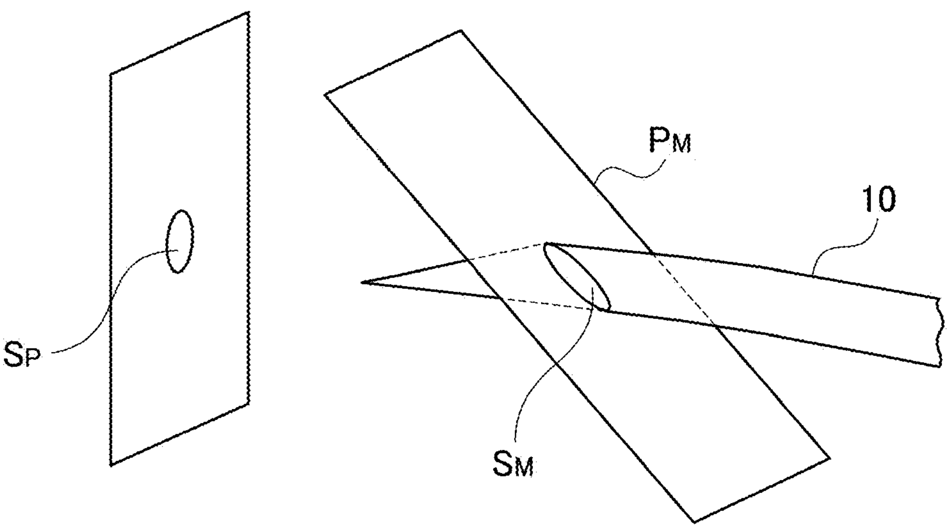
FIG. 6 A diagram for describing the definition of an equivalent cross-sectional area.

Here, as shown in FIG. 6, the equivalent cross-sectional area of the supersonic aircraft is a distribution of a projected area $S_P$ of a cross-sectional area $S_M$ taken along a Mach plane $P_M$ determined by a cruise Mach number of the supersonic aircraft. The Mach plane $P_M$ is a plane obtained by tilting a normal vector by an angle $\mu=\sin^{-1}(1/M)$ with respect to an aircraft axis. In addition, due to the geometrical relation, the cross-sectional area $S_M$ is identical to the value obtained by multiplying the projected area $S_P$ by the cruise Mach number M.

The angle μ is a semi-apex angle of the Mach cone (CONE in the conical form) having the nose tip of the aircraft 10 as its apex.

As shown in FIG. 5, the Mach plane $P_M$ refers to a plane in contact with a generatrix $BL_{on}$ extending along an area directly below the aircraft 10 (hereinafter referred to as "on-track position") in the Mach cone (CONE in the conical form).

The target equivalent cross-sectional area of the aircraft 10 is typically empirically determined based on the equivalent cross-sectional area of the initial shape so that sonic booms can be reduced.

The cruise speed of a supersonic aircraft is, for example, Mach 1.6.

Figure 7:
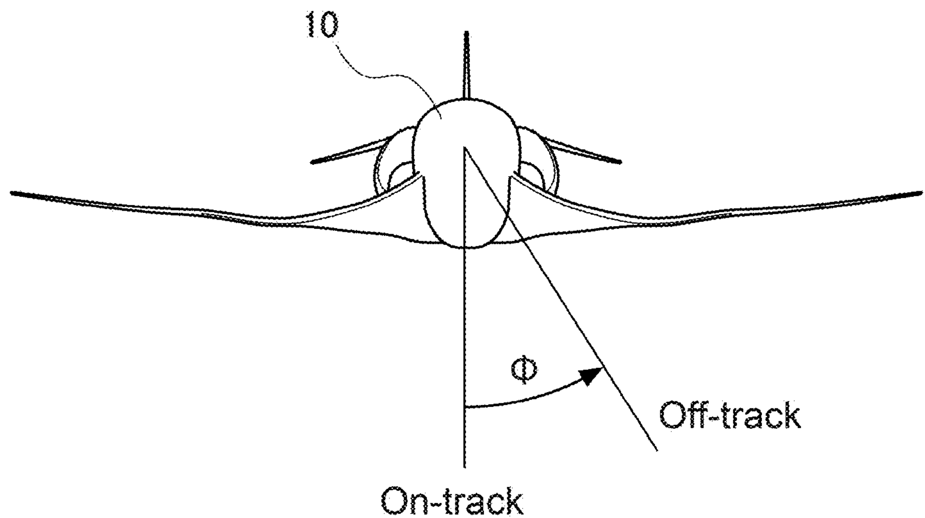
FIG. 7 A front view of FIG. 5, which is a diagram for describing an image of propagation of sonic booms.

As shown in FIGS. 5 and 7, the near field is a position close to the aircraft 10 directly below the aircraft 10 (on-track). For example, provided the length of the aircraft 10 is 1, the near field is a position spaced downward apart from the aircraft 10 by 0.3.

A pressure signature in the near field for the initial shape can be typically obtained by wind tunnel testing or numerical simulation modelling.

Patent Literature 1 efficiently makes a low sonic boom aircraft shape design directly under the aircraft 10, i.e., at the on-track position.

The design method described in Patent Literature 1 is a method of reducing boom loudness at the on-track position at a design Mach number. In this design method, the on-track Mach plane depending on the cruise speed is set, and the design curve corresponding to the initial curve where the initial shape of the aircraft intersects the Mach plane is set on the Mach plane so that the equivalent cross-sectional area becomes close to the target equivalent cross-sectional area.

Figure 24:
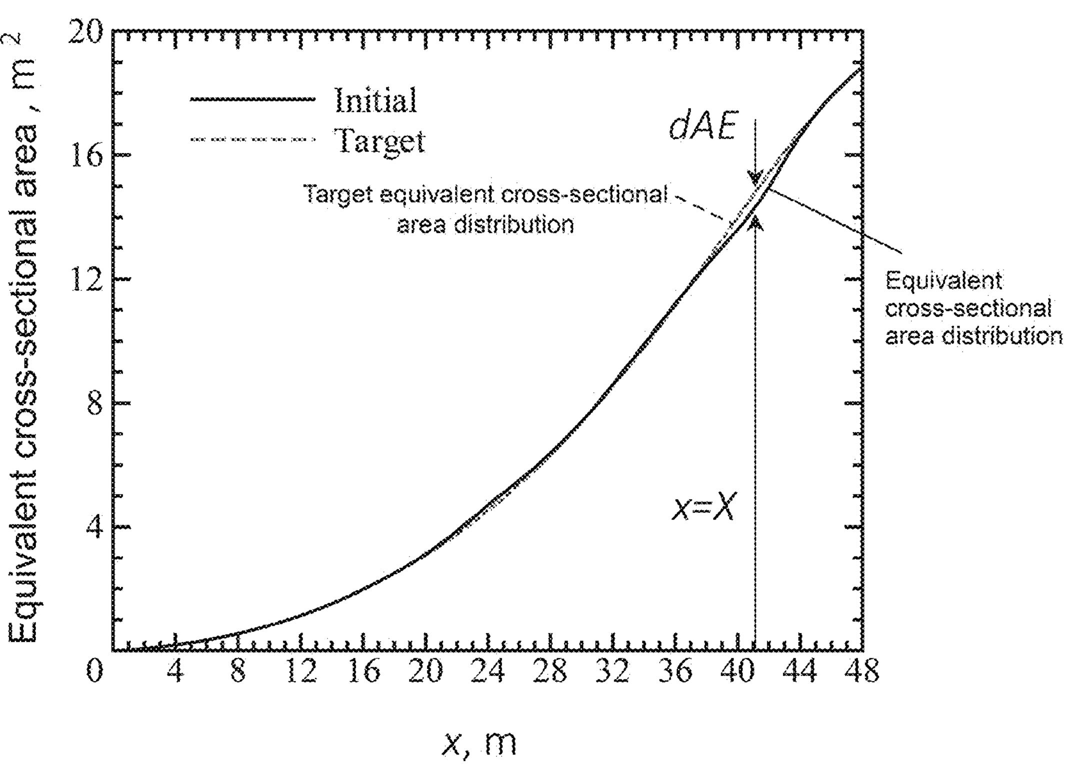
FIG. 24 A diagram describing a method of designing a low sonic boom aircraft shape at the on-track position.

For example, as shown in FIG. 24, a case where the shape on a lower surface side of the aircraft at any position (x=X) in the airflow direction of the aircraft is designed will be described as follows.

First, a difference (dAE) between the target equivalent cross-sectional area at x=X and the equivalent cross-sectional area of the initial shape of the aircraft is calculated from the equivalent cross-sectional area distribution shown on the upper side of FIG. 24. Next, based on the calculated difference (dAE), the shape on the lower surface side of the aircraft at the position where X=X is modified on the on-track Mach plane that extends through x=X as shown on the lower side of FIG. 24. The modified cross-sectional shape is set to be symmetrical on the left and right sides of the aircraft.

In this embodiment, a low sonic boom aircraft shape that simultaneously reduces on-track sonic booms and sonic booms at a position deviating from the position directly below the aircraft in the circumferential direction (hereinafter referred to as "off-track position") and is robust in the circumferential direction is efficiently designed.

Figure 8:
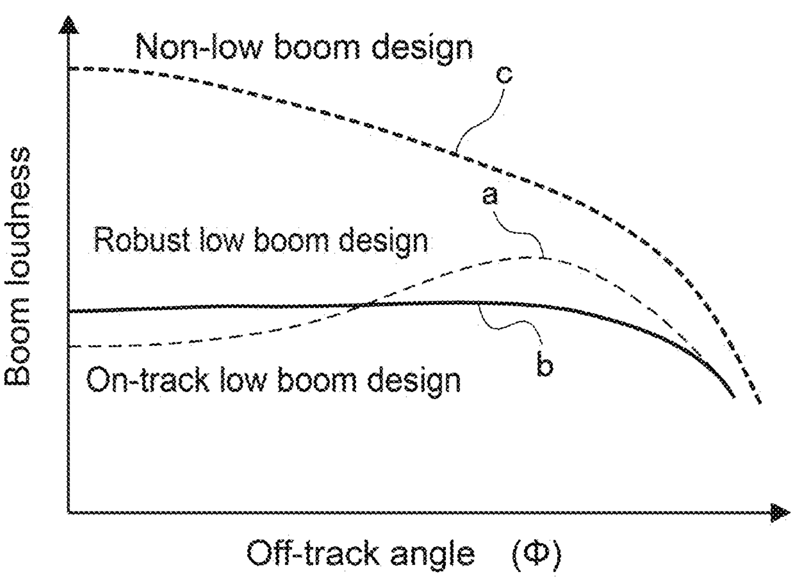
FIG. 8 A diagram for describing an image of a low sonic boom design that is robust in the circumferential direction, which is a graph showing a relation between an off-track angle and sonic boom loudness in each design.

For example, FIG. 8 shows an example of the relation between sonic boom loudness and an off-track angle. The off-track angle φ refers to an angle φ (°) of the off-track position relative to the on-track position as shown in FIG. 7.

The dotted line a of FIG. 8 shows a case of an on-track low sonic boom design. Sonic boom reduction considering only on-track sonic booms increases the off-track sonic boom loudness. On the other hand, the solid line b shows a case of a low sonic boom design (robust low sonic boom design) that is robust in the circumferential direction. The solid line c shows a case of a non-low sonic boom design in which the low sonic boom design is not made for both the on-track position and the circumferential direction.

In this embodiment, a distribution in the airflow direction of the target equivalent cross-sectional area for the off-track position (hereinafter referred to as "target equivalent cross-sectional area distribution") is converted into a target equivalent cross-sectional area distribution for the on-track position. More specifically, in this embodiment, a required additional cross-sectional area of the cross section of the aircraft on the off-track Mach plane at the design Mach number is converted into a required additional cross-sectional area of the aircraft on the on-track Mach plane at the design Mach number.

This "conversion" realizes an aircraft shape design considering low sonic boom properties at the off-track position only by using numerical values related to the on-track position where the cross-sectional shape (intersection line between the aircraft and the Mach plane) for calculating the equivalent cross-sectional area of the aircraft 10 is symmetrical, and the problem of left-right non-symmetry is solved.

Next, the converted target equivalent cross-sectional area distribution for the off-track position and the target equivalent cross-sectional area distribution for the on-track position are blended, and a single target equivalent cross-sectional area distribution capable of reducing sonic booms at both the off-track and on-track positions is set. This "blending" replaces the plurality of target equivalent cross-sectional area distributions for the off-track and on-track positions with a single, i.e., realizable target equivalent cross-sectional area for the on-track position, taking into account the robustness in the circumferential direction.

Patent Literature 1 shows a method of efficiently designing a low sonic boom shape at the on-track position, and by using the invention according to Patent Literature 1 and the method according to this embodiment, a low sonic boom aircraft shape that is robust in the circumferential direction can be efficiently designed without using a design optimization method of Non-Patent Literature 6.

The specific methods of "conversion" and "blending" will be described below. Here, a given initial shape is modified to reduce sonic booms.

First of all, "conversion" is performed in accordance with the following flow.

Figure 9:
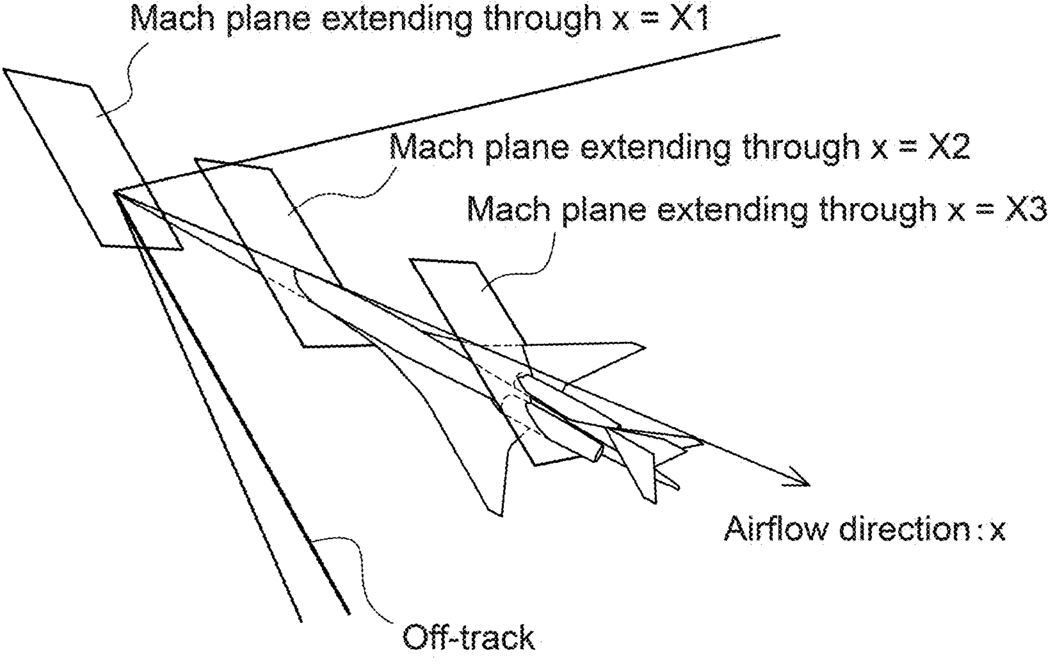
FIG. 9 A perspective view for describing a method of calculating an equivalent cross-sectional area of an aircraft with an initial shape at an off-track position.

As shown in FIG. 9, the equivalent cross-sectional area distribution at the off-track position (hereinafter referred to as "equivalent cross-sectional area distribution") of the aircraft 10 having the initial shape is calculated. Here, although any angle can be used as the off-track angle φ, it is better to select an angle φ that provides large sonic boom loudness in the initial shape. In addition, in a case where the angle φ that provides large sonic boom loudness in the initial shape is selected, it has been empirically found that the off-track sonic boom loudness other than the selected φ does not decrease even if the shape is thereafter modified. In that case, the angle φ is selected as necessary. Although in the following embodiment, the angle at which the sonic boom loudness is large in the initial shape is 30 degrees, 40 degrees was selected as the angle φ for such a reason. A plurality of angles may be selected as the angle φ.

The equivalent cross-sectional area distribution of the aircraft 10 is a function of a position (x) in the airflow direction, and the cross-sectional area of the aircraft 10 is calculated based on a cross-sectional shape of the aircraft 10 on the off-track Mach plane that extends through x=X1, X2, X3 . . . . Note that it is favorable to use a reversed equivalent cross-sectional area distribution for an accurate low sonic boom aircraft shape design. The off-track Mach plane refers to a plane in contact with a generatrix $BL_{off}$ extending along the off-track position of the aircraft 10 in the Mach cone (CONE in the conical form) as shown in FIG. 5.

Figure 10:
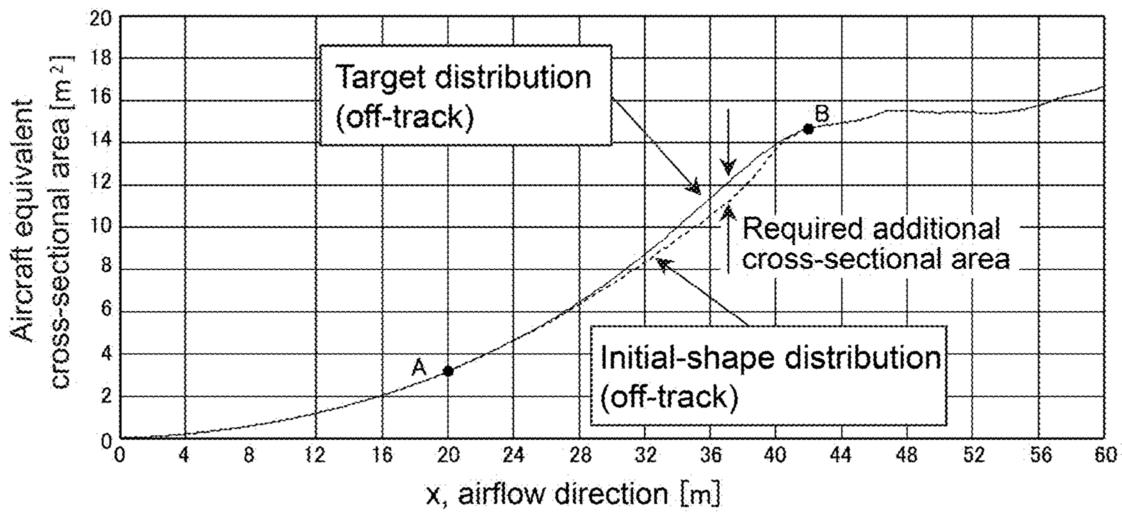
FIG. 10 A diagram for describing setting of a target equivalent cross-sectional area distribution for reducing sonic booms and a process of determining a required additional cross-sectional area, which is a graph showing a relation between the airflow direction and the equivalent cross-sectional area of the aircraft at the off-track position.

Next, as shown in FIG. 10, a target equivalent cross-sectional area distribution (target distribution) at the off-track position for reducing sonic booms is set based on the obtained equivalent cross-sectional area distribution (initial-shape distribution) at the off-track position of the aircraft 10.

As the target equivalent cross-sectional area distribution, a smooth distribution is set using a polynomial here. The order of the polynomial is 6, and the coefficients are defined so that the polynomial has the same zero-order, first-order, and second-order differential coefficients as the initial-shape distribution at an endpoint A (point of x=20 m in FIG. 10) and an endpoint B (point of x=41.9 m in FIG. 10) and that the third-order differential coefficient at the endpoint A is zero.

Figure 11:
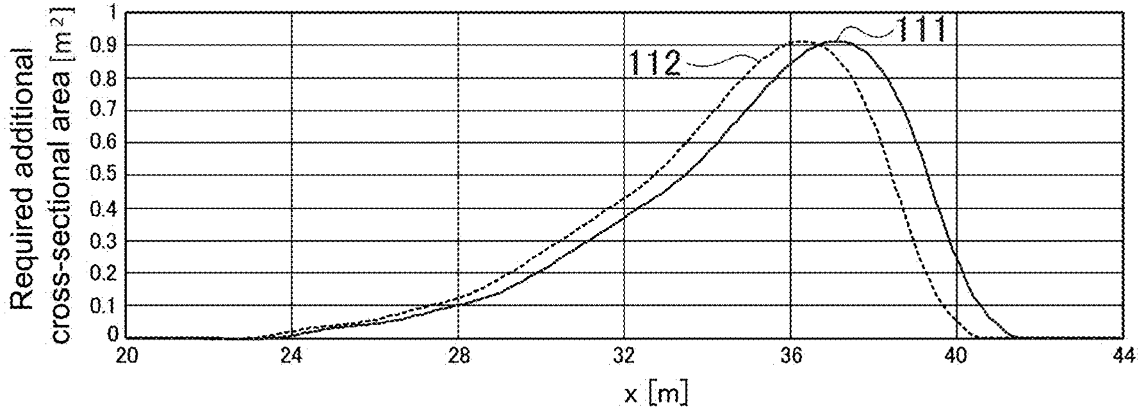
FIG. 11 A diagram for describing conversion of the required additional cross-sectional area, which is a graph showing a relation between the airflow direction and the required additional cross-sectional area at off-track and on-track positions.

Based on the difference between the obtained target distribution and the initial-shape distribution (hereinafter referred to as "required additional cross-sectional area distribution"), the shape of the aircraft 10 is modified. As for the modification of the shape of the aircraft 10, according to Non-Patent Literature 1, in a case where the required additional cross-sectional area at x=X1 is positive, the cross-sectional shape of the aircraft 10 on the off-track Mach plane that extends through x=X1 is enlarged so as to match the required additional cross-sectional area. Here, in view of the problem of left-right non-symmetry as described above, a required additional cross-sectional area distribution 111 that should be added in the off-track Mach plane is converted into a required additional cross-sectional area distribution 112 that should be added in the on-track Mach plane as shown in FIG. 11.

Figure 12:
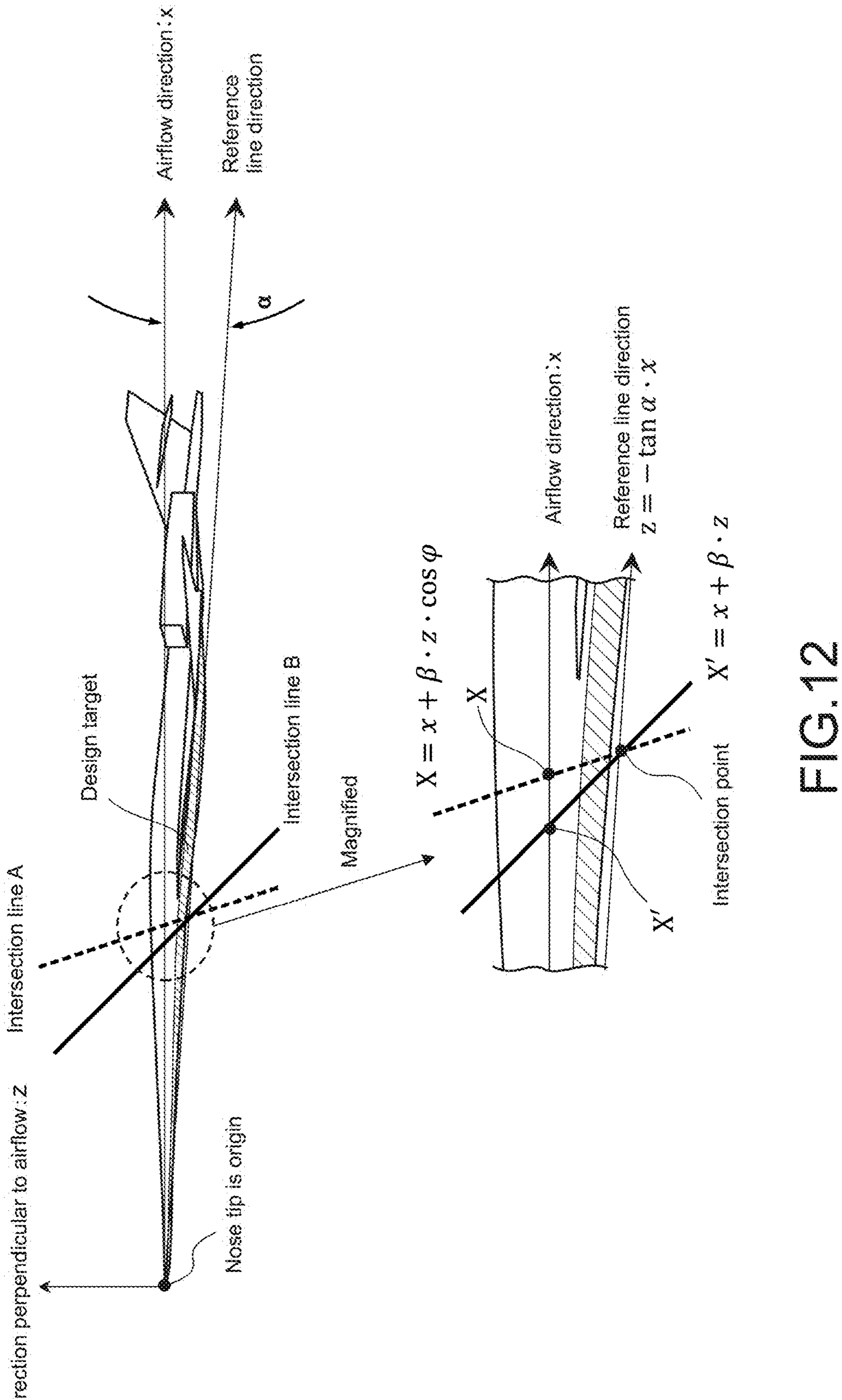
FIG. 12 A diagram for describing "conversion" according to a first embodiment of the present invention in detail.

Here, sonic booms are derived from a pressure wave propagating to the ground, and in order to effectively reduce the sonic booms, it is favorable to design the shape on the lower surface side of the aircraft 10. For this reason, here, the lower surface of the fuselage 11 of the aircraft 10 is set as the design target as shown in FIG. 12.

By specifying an arbitrary position in the airflow direction (e.g., x=X), an off-track Mach plane (Mach plane A) that extends through this position is defined. In FIG. 12, an intersection line between the Mach plane A and an aircraft symmetry plane (also referred to as intersection line A) is shown. The cross section of the aircraft on the Mach plane A (also referred to as cross section A) spans the front and rear of the intersection line A.

According to Non-Patent Literature 1, the required additional cross-sectional area at x=X is added in the cross section A. However, here, the required additional cross-sectional area at x=X is added in a cross section (cross section B) of the aircraft on the on-track Mach plane that is located near the cross section A.

A reference line is introduced for defining the cross section B. Since it is important that the cross section A and the cross section B are in proximity to each other, the reference line is an axis extending from a starting point that is the nose tip of the aircraft, which is an axis tilted by an arbitrary angle (angle $\alpha$) with respect to the airflow direction so as to be in proximity to the design target site. Here, since the aircraft axis extends near the design target site, the aircraft axis is used as the reference line (see FIG. 12). Hereinafter, the angle $\alpha$ will also be referred to as an angle of attack.

An on-track Mach plane (Mach plane B) that extends through an intersection point of the intersection line A and the reference line is defined. In FIG. 12, the intersection line between Mach plane B and the aircraft symmetry plane (also referred to as intersection line B) is shown. The required additional cross-sectional area is added to a cross section of aircraft 10 on the Mach plane B (also referred to as cross section B).

Figure 13:
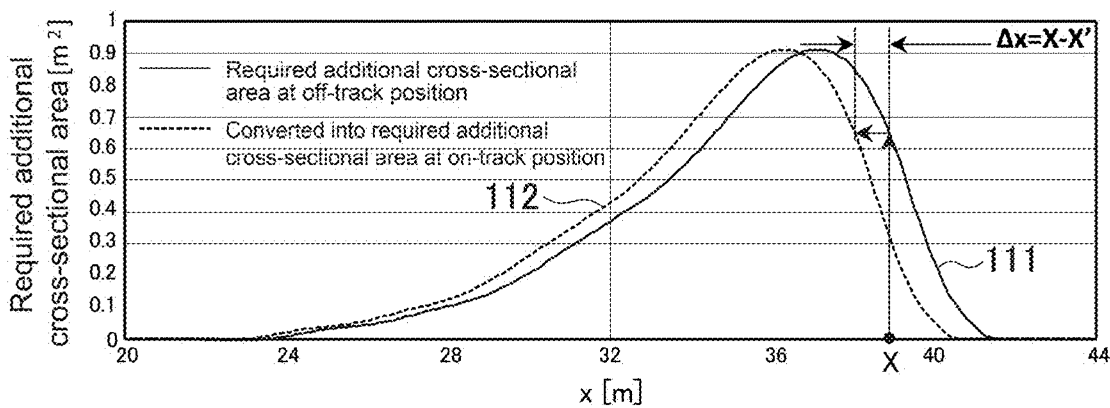
FIG. 13 A diagram showing an example of "conversion", which is a graph showing a relation between the airflow direction and the required additional cross-sectional area at the off-track and on-track positions.

Here, the position of the Mach plane is based on the airflow direction, and as shown in FIG. 12, the position of the off-track Mach plane A is x=X and the position of the on-track Mach plane B is x=X'. Since the required additional cross-sectional area that originally should be added in the off-track Mach plane A at x=X is added in the on-track Mach plane B at x=X', the position x in the airflow direction has to be shifted by X-X'. This is conversion. Specifically, as shown in FIG. 13, the required additional cross-sectional area distribution is shifted forward by X-X' where X is arbitrary.

Here, in FIG. 12, provided that the position in the airflow direction is denoted by x, a direction perpendicular to the airflow is denoted by z, an angle formed by the airflow direction and the direction of the reference line is denoted by $\alpha$, and an airflow Mach number is denoted by M and $\beta=\sqrt{(M^2-1)}$ is established, the following equations are established.

$$X = x + \beta \cdot z \cdot \cos\varphi$$

$$X' = x + \beta \cdot z$$

$$z = -\tan\alpha \cdot x$$

Therefore, the forward shift $\Delta x = X - X'$ from the required additional cross-sectional area distribution at the off-track position to the required additional cross-sectional area distribution at the on-track position at the time of "conversion" as shown in FIG. 13 is represented as follows.

$$\Delta x = (\beta \cdot \tan\alpha \cdot (1 - \cos\varphi) / (1 - \beta \cdot \cos\varphi \cdot \tan\alpha))X$$

Next, the "blending" is performed in accordance with the following flow.

The required additional cross-sectional area distribution obtained by applying the above-mentioned conversion for reducing sonic booms at the off-track position will be referred to as a distribution A (the dotted line 112 of FIG. 13 corresponds to the distribution A). Moreover, the required additional cross-sectional area distribution for reducing on-track sonic booms will be referred to as a distribution B (in a case where the initial shape has already been designed for reducing on-track sonic booms, the distribution B is such a distribution that the required additional cross-sectional area is zero for all x).

A blend ratio f is introduced, and the distribution A and the distribution B are represented by a single distribution C as shown in the following equation.

Distribution C=distribution A×f1+distribution B×f2
Where f1+f2=1

Note that in a case where a plurality of angles are set as the off-track angle $\varphi$, it is sufficient that the distribution C is defined by the following equation.

$$\text{Distribution } C = \text{distribution } A1 \times f11 + \text{distribution } A2 \times f12 + \text{distribution } A3 \times f13 + \ldots + \text{distribution } B \times f2$$

$$\text{Where } f11 + f12 + f13 + \ldots + f2 = 1$$

Note that A1, A2, A3, . . . are required additional cross-sectional area distributions at a plurality of off-track angles.

In order to realize low sonic boom properties that are robust in the circumferential direction, the blend ratio is determined as follows.

When the distribution C is determined by specifying the blend ratio, equivalent cross-sectional area distributions at the on-track and off-track positions of the aircraft 10 when the distribution C is added are obtained. From the equivalent cross-sectional area distributions of the aircraft 10, pressure signatures near the aircraft at the on-track and off-track positions can be obtained using the technology described in Non-Patent Literature 1. The technology described in Non-Patent Literature 1 calculates an equivalent cross-sectional area distribution of the aircraft 10 (sum of a cross-sectional area and a cross-sectional area equivalent to lift of the aircraft) for reducing sonic booms with respect to the design conditions of the aircraft (e.g., aircraft length, aircraft weight, flight Mach number, flight altitude). From these pressure signatures, a sonic boom signature on the ground can be calculated and the on-track and off-track sonic boom loudness can be evaluated.

Repeating such on-track and off-track sonic boom loudness evaluation for a plurality of blend ratios, there is a tendency that on-track sonic booms are reduced as the blend ratio f2 becomes higher and sonic booms at the off-track position are reduced as the blend ratio f1 becomes higher. Based on this result, a blend ratio is set so that the on-track and off-track sonic boom loudness can be balanced.

Figure 14:
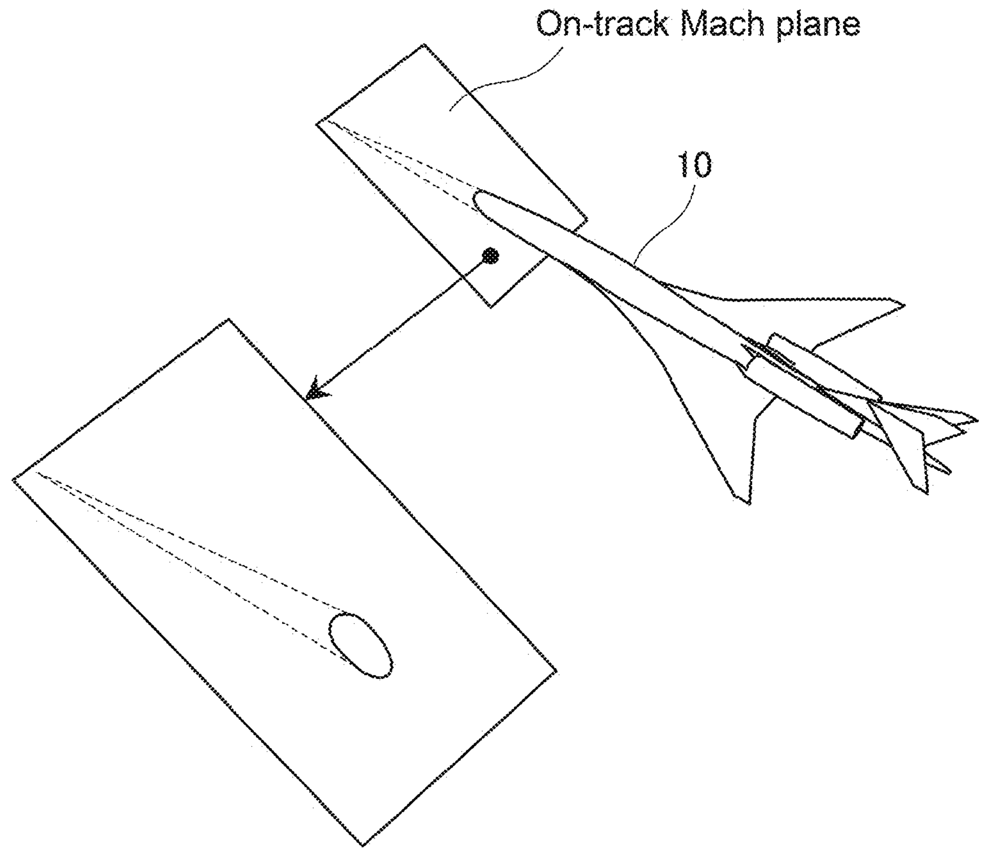
FIG. 14 A perspective view for describing a method of designing an aircraft shape by applying the technology of Patent Literature 1 to the present invention.

Since the distribution C is a single required additional cross-sectional area distribution that should be added in the on-track Mach plane, an aircraft shape that satisfies this surely exists. Since an efficient aircraft shape design method suitable for the cross-sectional area distribution at the on-track position has already been shown in the technology of Patent Literature 1, an aircraft shape that realizes the distribution C is designed as shown in FIG. 14, for example, by using this efficient aircraft shape design method. That is, the cross-sectional shape on the on-track Mach plane is scaled to match the required additional cross-sectional area. This eliminates the need for optimization.

According to this embodiment, the required additional cross-sectional area distribution at the off-track position is converted into the required additional cross-sectional area distribution at the on-track position and the plurality of required additional cross-sectional area distributions are blended to be the single distribution, thereby obtaining a single realizable distribution capable of reducing sonic booms that is robust in the circumferential direction. This distribution is for the on-track position, and by applying the technology described in Patent Literature 1, it is possible to efficiently design the shape of the aircraft. As a result, sonic boom reduction not only for the off-track position but also for the on-track position is achieved.

Example 1

Hereinafter, an example in which this embodiment is applied to a front sonic boom reduction design of a 50-seat supersonic airliner will be described.

Figure 15:
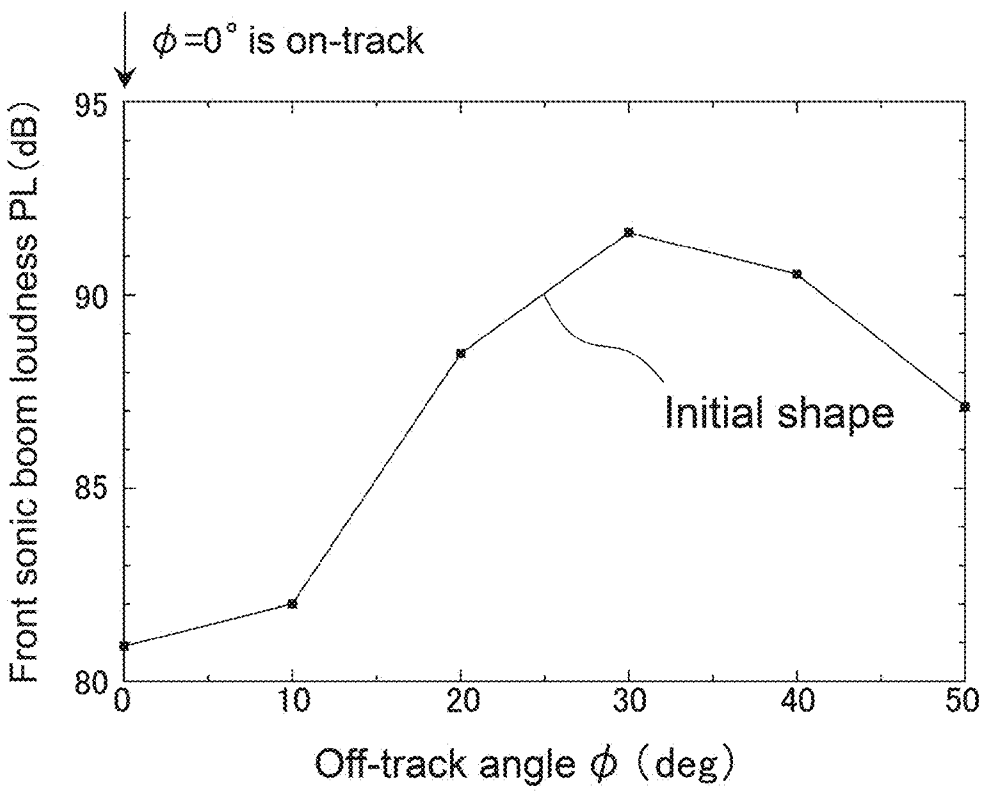
FIG. 15 A graph showing an initial shape in Example 1 according to the present invention, which is a graph showing a relation between the off-track angle and front sonic boom loudness.
Figure 16:
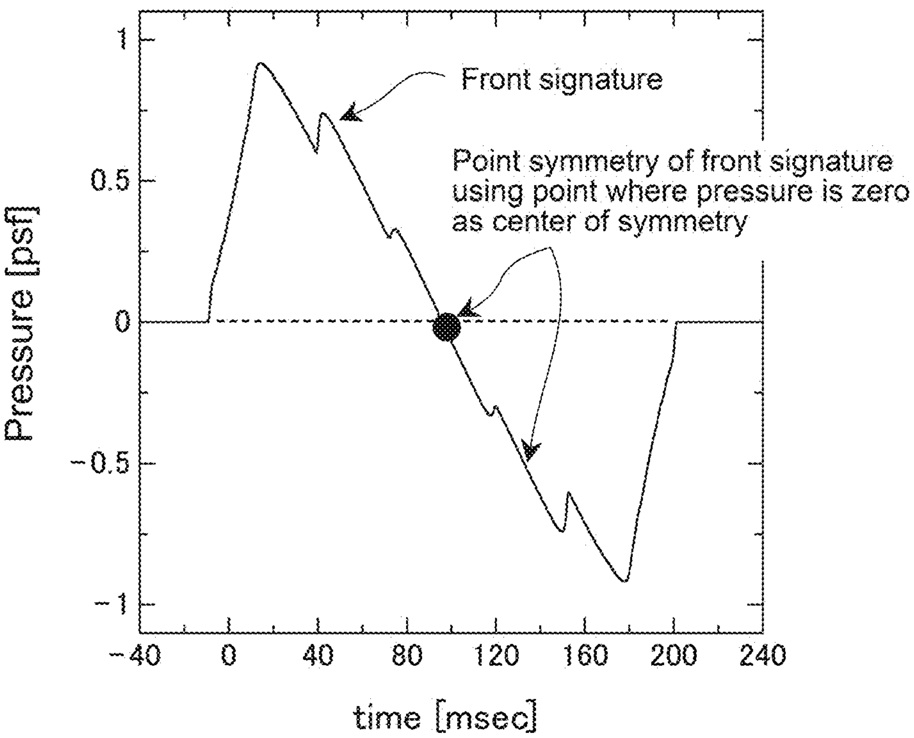
FIG. 16 A graph showing a method of modifying a pressure signature for evaluating the front sonic boom loudness.

FIG. 15 shows front sonic boom loudness for an aircraft shape (called initial shape) modified to reduce only on-track sonic booms. Here, as shown in FIG. 16, the front sonic boom loudness represents sonic boom loudness with respect to signatures whose rear sonic boom signatures are obtained by inverting front sonic boom signatures point-symmetrically. Note that for the boom loudness, a reflection coefficient on the ground was set to 1.9 and Stevens Perceived Level Mark VII (PL) was used as an evaluation tool. Although this method can also be applied to rear sonic boom reduction, the front sonic boom loudness was set as the target as a typical example.

The front sonic boom loudness is 81 dB at the on-track position ($\varphi$=0 degrees), but the front sonic boom loudness exceeds 90 dB at the off-track position $\varphi$=30 degrees, 40 degrees. Here, the front sonic boom loudness is made robust in the circumferential direction, setting $\varphi$=40 degrees as the target. Since in a case where 30 degrees, which is the angle $\varphi$ that provides large sonic boom loudness in the initial shape, is selected, it has been empirically found that the sonic boom loudness at $\varphi$=40 degrees does not decrease even if the shape is thereafter modified, the front sonic boom loudness was made robust in the circumferential direction, setting $\varphi$=40 degrees as the target.

Figure 17:
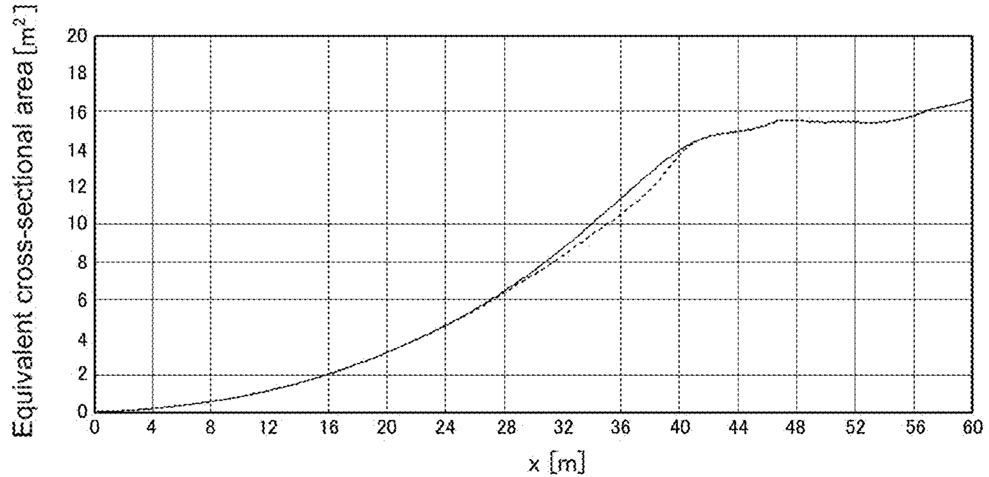
FIG. 17 A graph showing a relation between the airflow direction and an equivalent cross-sectional area at the off-track position of an aircraft in Example 1 according to the present invention.
Figure 18:
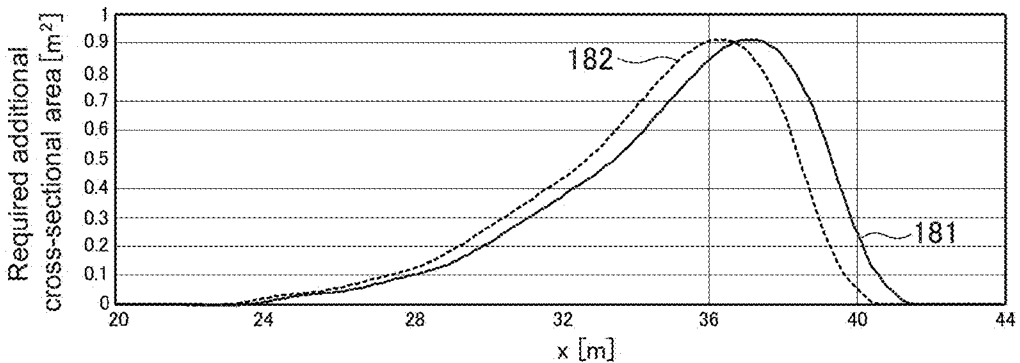
FIG. 18 A graph showing a relation between the airflow direction and a required additional cross-sectional area at the off-track and on-track positions in Example 1 according to the present invention.

The dotted line of FIG. 17 shows an equivalent cross-sectional area distribution of the aircraft 10 having an initial shape at $\varphi$=40 degrees, and a target equivalent cross-sectional area distribution of the aircraft, which is shown as the solid line, was set for performing sonic boom reduction on it. A difference between the solid line and the dotted line is a required additional cross-sectional area distribution and corresponds to the line 181 of FIG. 18. A distribution obtained by converting under the conditions that the off-track angle $\varphi$=40 degrees, the angle of attack $\alpha$=4 degrees, $\beta=\sqrt{(M^2-1)}$, and M=1.6 in the converted calculation equation described in FIG. 13, is a distribution shown as the dotted line 182 of FIG. 18.

Figure 19:
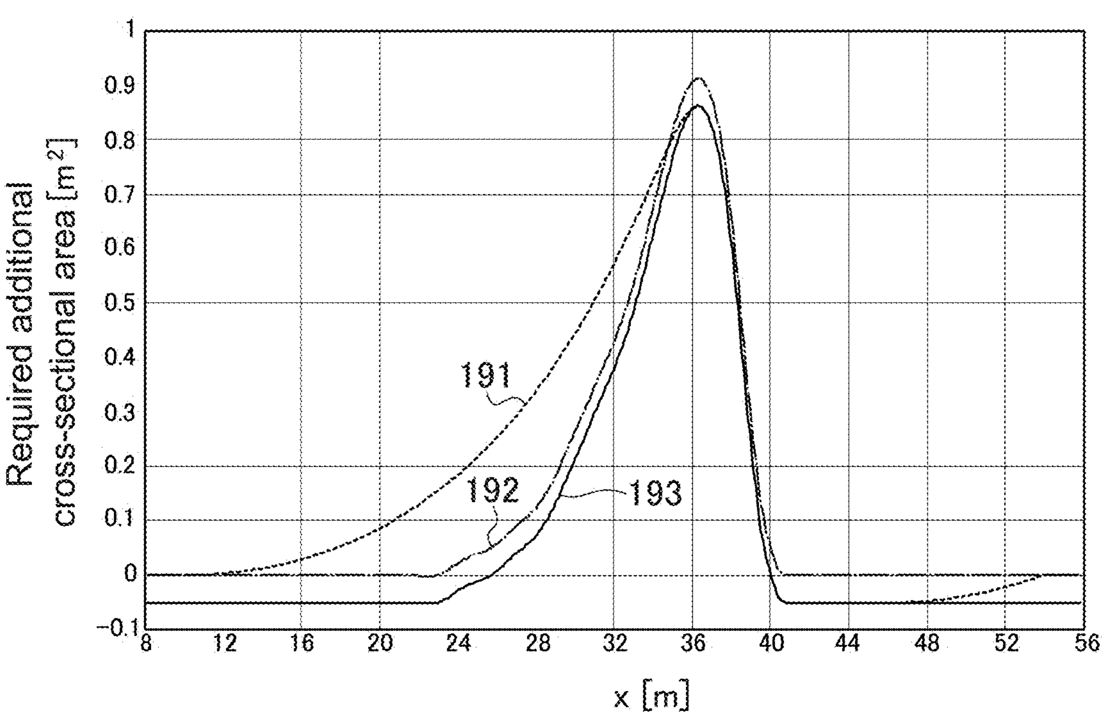
FIG. 19 A distribution diagram for describing modification of required additional cross-sectional area distributions in blend of the required additional cross-sectional area distributions in Example 1 according to the present invention.

FIG. 19 is a distribution diagram for describing modification of the distribution in the blend of the required additional cross-sectional area distributions. The dashed line 192 of FIG. 19 indicates a signature of the dotted line 182 of FIG. 18, and the dotted line 191 indicates a signature obtained by modifying the signature. Specifically, the dotted line 191, which is the modified distribution, adds a vertical offset to the dashed line 192 (line 193 of FIG. 19), and the required additional cross-sectional area takes a continuous value so that it starts from 0 and ends at 0 in a predetermined range of x and has a smooth distribution. Note that this modification does not need to be performed and the offset or the like may be zero.

Figure 20:
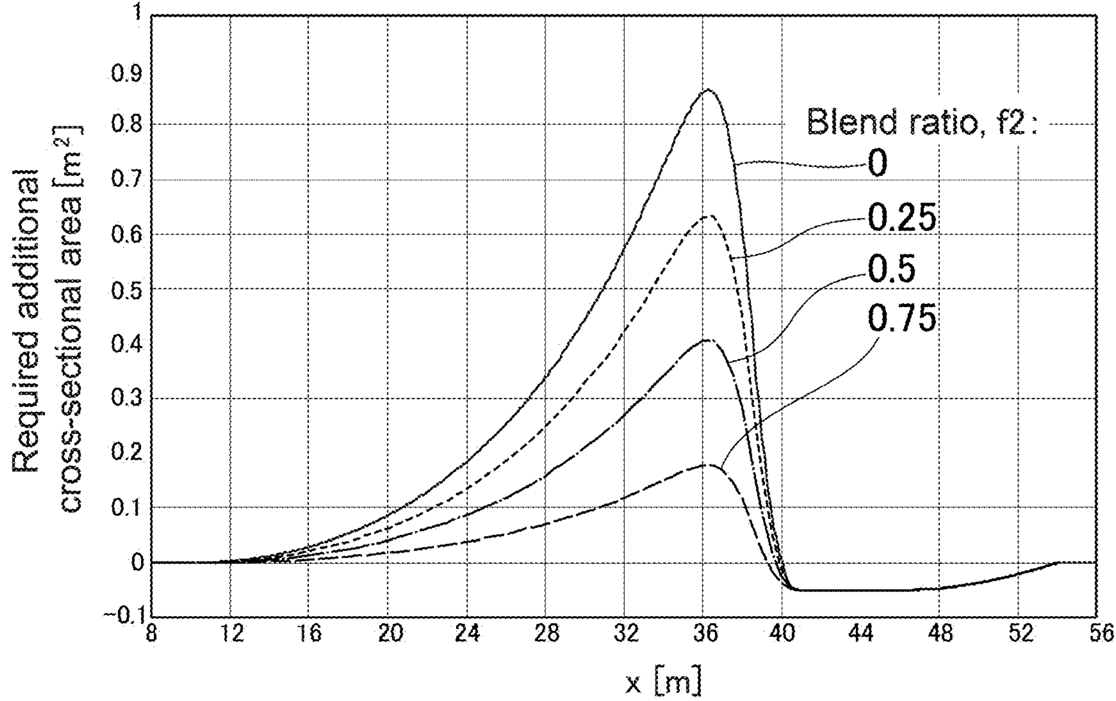
FIG. 20 A distribution graph for describing setting of a blend ratio considering robustness in Example 1 according to the present invention, which is a graph showing a required additional cross-sectional area in the airflow direction at the blend ratio of 0, 0.25, 0.5, 0.75.

Since the on-track sonic boom reduction has already been designed, the additional cross-sectional area distribution required for reducing on-track sonic booms is a distribution that is zero for all x. Therefore, the blending corresponds to changing the height of the mountain in the line 191 of FIG. 19 (distribution in FIG. 20). FIG. 21 shows a result of estimating the front sonic boom loudness for each blend ratio, and it can be seen that by setting the blend ratio to 0.7, the low sonic boom properties at the on-track and off-track positions are balanced. Therefore, the shape of the aircraft was designed by setting the blend ratio to 0.7. This shape will be referred to as a robust low boom shape.

Figure 23:
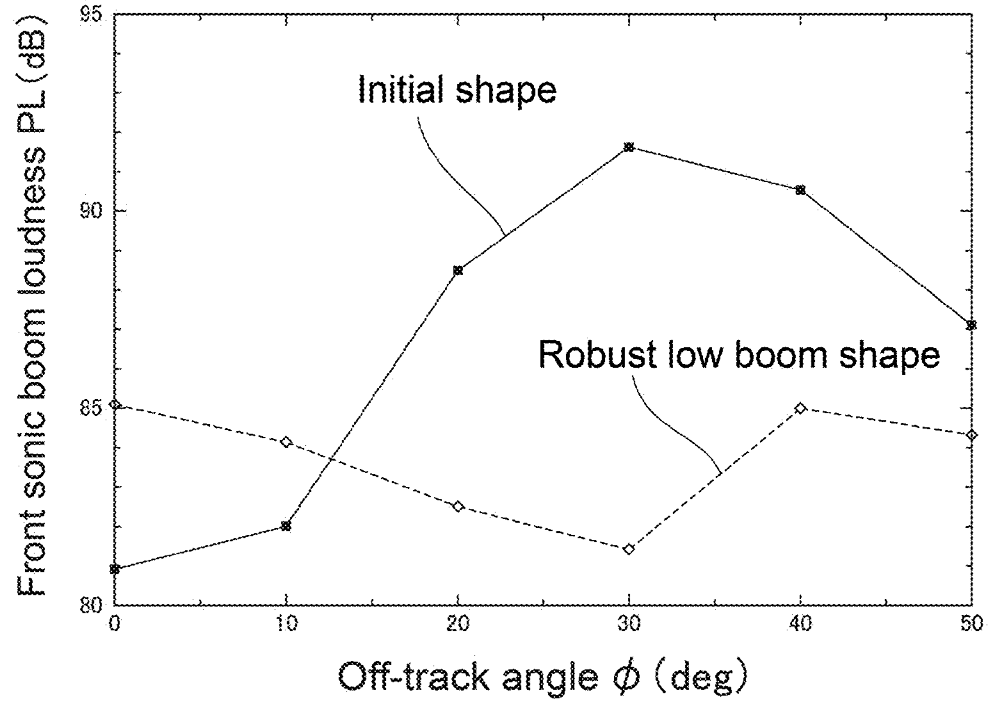
FIG. 23 A graph showing the front sonic boom loudness with respect to the off-track angle with the initial shape of FIG. 22(*a*) and the robust low boom shape of FIG. 22(*b*).

FIGS. 22(*a*) and 22(*b*) are side views showing the shape of the aircraft in the embodiment, in which FIG. 22(*a*) shows the initial shape and FIG. 22(*b*) shows the robust low boom shape obtained by applying the required additional cross-sectional area to the initial shape (shown as the oblique lines in the figure). FIG. 23 shows the front sonic boom loudness with the initial shape and the robust low boom shape. Comparing the worst sonic boom loudness values in the off-track region up to 50 degrees, it was 91.6 dB ($\varphi$=30 degrees) with the initial shape while it was 85.1 dB ($\varphi$=0 degrees). That is, a sonic boom reduction effect of 6.5 dB was obtained.

Second Embodiment

In the first embodiment described above, mainly the method of designing the low boom aircraft shape that is robust in the circumferential direction under the cruise conditions (design Mach number) of the supersonic aircraft has been described as an example. In this embodiment, in addition to the low boom design that is robust in the circumferential direction, a low boom design robust in the climb phase (off-design Mach number) until the cruise conditions of the supersonic aircraft are reached will be described.

Figure 25:
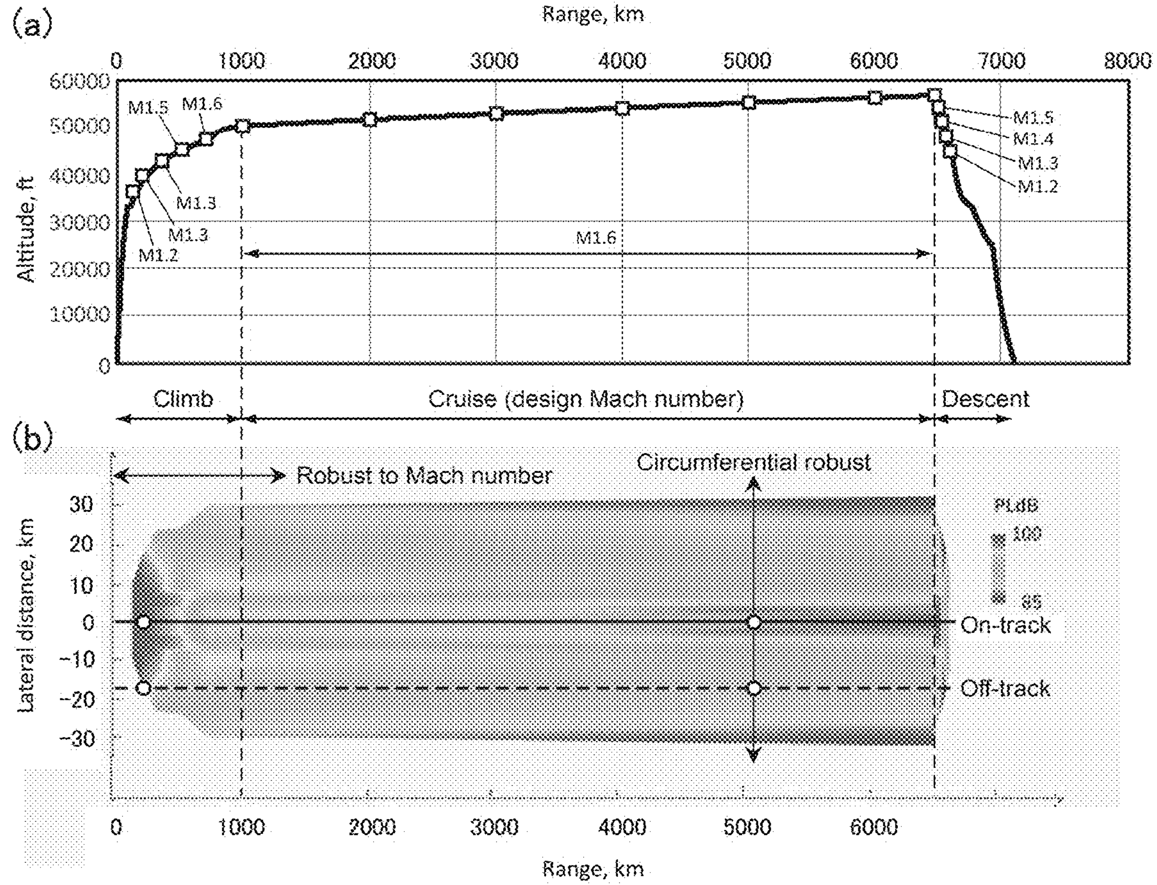
FIG. 25 A diagram showing an example of sonic boom loudness (primary boom carpet) for the entire flight path of a supersonic aircraft.

FIG. 25 shows an example of sonic boom loudness (primary boom carpet) for the entire flight path of a supersonic aircraft designed to reduce on-track booms under the cruise conditions (design Mach number: M1.6). The upper side of the figure shows a relation between an altitude and a flight distance in the flight path in climb, cruise, and descent phases and the lower side shows sonic boom loudness in a lateral direction of the aircraft. It can be seen from the figures that even if a low boom aircraft shape that is robust in the circumferential direction is designed under the cruise conditions by the method described in the first embodiment, sonic boom loudness generated during the climb phase until the cruise conditions (off-design Mach number: M1.2 to 1.5) are reached is still large.

Therefore, it is an object of this embodiment to provide a method of designing an aircraft shape of a supersonic aircraft that realizes a low boom design that is robust to the Mach number in addition to the low boom design that is robust in the circumferential direction. Hereinafter, configurations different from the first embodiment will be mainly described, and configurations similar to those of the first embodiment will be omitted or simplified with the similar reference signs.

In this embodiment, as in the first embodiment, a distribution in the airflow direction of the target equivalent cross-sectional area for the off-track position (target equivalent cross-sectional area distribution) is converted into a target equivalent cross-sectional area distribution for the on-track position. At this time, in this embodiment, in order to realize a low boom design robust to the Mach number, the required additional cross-sectional area of the cross section of the aircraft on the off-track Mach plane at the off-design Mach number is converted into the required additional cross-sectional area of the cross section of the aircraft on the on-track Mach plane at the design Mach number. This point is different from the first embodiment.

Hereinafter, a specific "conversion" method will be described.

First, as in the first embodiment, the equivalent cross-sectional area distribution at the off-track position of the aircraft 10 having the initial shape is calculated. This equivalent cross-sectional area distribution is a function of a position (x) in the airflow direction, and as shown in FIG. 9, the cross-sectional area of the aircraft 10 is calculated based on the cross-sectional shape of the aircraft 10 on the off-track Mach plane that extends through x=X1, X2, X3 . . . . Note that it is favorable to use a reversed equivalent cross-sectional area distribution for an accurate low sonic boom aircraft shape design.

Next, based on the obtained equivalent cross-sectional area distribution at the off-track position of the aircraft 10, a target equivalent cross-sectional area distribution at the off-track position for reducing sonic booms is set (see FIG. 10). A smooth distribution is set using a polynomial also here.

Subsequently, a difference (required additional cross-sectional area distribution) between the obtained target equivalent cross-sectional area distribution and the equivalent cross-sectional area distribution of the initial-shape should be added on the off-track Mach plane, but as in the first embodiment, it is converted into a required additional cross-sectional area distribution that should be added on the on-track Mach plane (see FIG. 11).

Sonic booms are derived from pressure waves propagating to the ground, and in order to effectively reduce the sound booms, it is favorable to design the shape on the lower surface side of the aircraft 10. For this reason, the lower surface of the fuselage 11 of the aircraft 10 is designed also in this embodiment.

Figure 26:
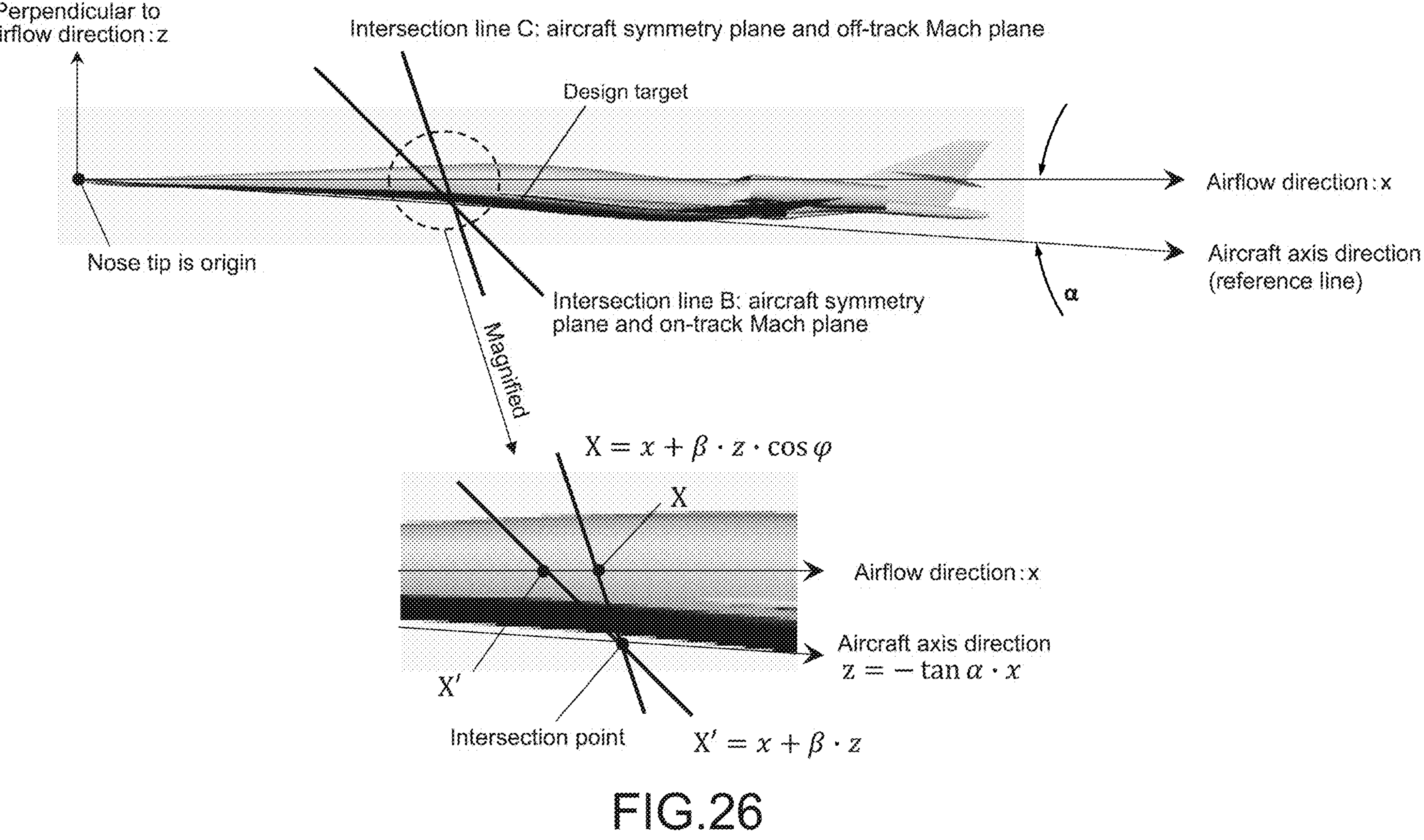
FIG. 26 A diagram for describing "conversion" according to a second embodiment of the present invention.

As shown in FIG. 26, by specifying an arbitrary position in the airflow direction (e.g., x=X), an off-track Mach plane (Mach plane C) that extends through this position is defined. FIG. 26 shows an intersection line (intersection line C) between the Mach plane C and the aircraft symmetry plane. The cross section of the aircraft on the Mach plane C (also referred to as cross section C) spans the front and rear of the intersection line C.

According to Non-Patent Literature 1, the required additional cross-sectional area at x=X is added in the cross section C. However, here, the required additional cross-sectional area at x=X is added in a cross section (cross section B) of the aircraft on the on-track Mach plane (Mach plane B, intersection line B) that is located near the cross section C.

A reference line is introduced for defining the cross section B. Since it is important that the cross section C and the cross section B are in proximity to each other, the reference line has to extend near the design target site. Here, since the aircraft axis extends near the design target site, the aircraft axis is used as the reference line.

The on-track Mach plane (Mach plane B) that extends through the intersection point of the intersection line C and the reference line is defined. FIG. 26 shows the intersection line (intersection line B) between the Mach plane B and the aircraft symmetry plane. The cross section of the aircraft 10 on the Mach plane B is the cross section B, and then the required additional cross-sectional area is added.

Here, the position of the Mach plane is based on the airflow direction, and as shown in FIG. 26, the position of the off-track Mach plane Cis x=X and the position of the on-track Mach plane B is x=X'. Since the required additional cross-sectional area that originally should be added in the off-track Mach plane C at x=X is added in the on-track Mach plane B at x=X', the position x in the airflow direction has to be shifted by X-X'. This is conversion. Specifically, as shown in FIG. 13, the required additional cross-sectional area distribution is shifted forward by X-X' where X is arbitrary.

At this time, in the case where the Mach plane C is an off-track Mach plane at the off-design Mach number, "converting to the on-track Mach plane B from the off-track Mach plane C" is expanded so that the off-design Mach number can be considered. Here, the off-design Mach number is denoted by $M_{off}$, and the angle of attack at this time is denoted by α+dα (where da denotes a difference from the angle of attack α at the design Mach number M). The point to note for the expansion is that the Mach number can differ between the design Mach number M and the off-design Mach number $M_{off}$ and the angle of attack can also differ.

(Mach Number Difference)

As for the difference in Mach number, it is sufficient that β is calculated with the off-design Mach number $M_{off}$ in the following equations (1) and (2) representing the off-track Mach plane C (see the left side of FIG. 27).

$$X = x + \beta_{off} \cdot z \cdot \cos\varphi \quad (1)$$

$$\beta_{off} = \sqrt{(M_{off}^2 - 1)} \quad (2)$$

Therefore, a forward shift Δx (=X−X') from the required additional cross-sectional area distribution at the off-track position at the off-design Mach number to the required additional cross-sectional area distribution at the on-track position at the design Mach number at the time of conversion in this case is calculated by the following equation (3) in a case where da is set to 0.

$$\Delta x = (\tan\alpha \cdot (\beta - \beta_{off} \cdot \cos\varphi)/(1 - \beta_{off} \cdot \cos\varphi \cdot \tan\alpha))X \quad (3)$$

This equation (3) is a calculation equation for Δx in a case where only the Mach number changes and the angle of attack does not change.

(Difference in Angle of Attack)

The angle of attack depends on the Mach number, and at the off-design Mach number, the reference line is tilted by α+dα with respect to the airflow direction (x) (the left side of FIG. 27, Equation (4)).

$$z = -\tan(\alpha + d\alpha) \cdot x \quad (4)$$

Here, the intersection point of the intersection line C and the reference line is rotated by da around the origin (right side of FIG. 27, the origin is the nose tip). At this time, the rotated intersection point is located on the reference line at the design Mach number. The on-track Mach plane B is set as an on-track Mach plane at the design Mach number that extends through the rotated intersection point. Using X' at this time and the x position (X) of the off-track Mach plane C, the required additional cross-sectional area distribution is shifted forward by Δx (=X−X') (see FIG. 13, Equation (5)).

$$\Delta x = ((1 - \cos d\alpha - \beta \cdot \sin d\alpha - \tan(\alpha + d\alpha) \cdot B) / A)X \quad (5)$$

$$A = 1 - \beta_{off} \cdot \cos\varphi \cdot \tan(\alpha + d\alpha) \quad (6)$$

$$B = \beta_{off} \cdot \cos\varphi + \sin d\alpha - \beta \cdot \cos d\alpha \quad (7)$$

Note that the rotation direction when the intersection point of the intersection line C and the reference line is rotated by da around the origin is counterclockwise in FIG. 27 in a case where da is positive and clockwise in FIG. 27 in a case where da is negative.

By appropriately blending a plurality of required additional cross-sectional area distributions, which have been obtained by converting in the above-mentioned manner, to be a single required additional cross-sectional area distribution, a low boom design that is robust to the Mach number and also robust in the circumferential direction can be realized on the on-track Mach plane at the design Mach number.

Note that in the equation (1) above, φ=0 means that the off-track angle is zero, that is, the on-track position. Therefore, setting φ=0 in the equation (1) above can realize a low boom design that is robust to the Mach number at the on-track position.

Example 2

Hereinafter, an example in which this embodiment is applied to a front sonic boom reduction design of a 50-seat supersonic airliner will be described. Here, an aircraft 110 having the nose on which a pair of canards is mounted is used as a target as shown on the upper side of FIG. 28, and a method of robustly reducing sonic booms generated by the canards in the primary boom carpet will be described.

The flight conditions are that the Mach number is 1.6, the angle of attack (α) is 4.0 degrees, and the flight altitude is 49 kft at the designed point (design Mach number). At this time, in a case where the off-track angle is considered in 10-degree increments, the booms do not reach the ground at the off-track angle of 60 degrees, and therefore an off-track angle of 50 degrees or less is taken into consideration. The boom loudness is the largest at Mach 1.2 in FIG. 25, and therefore the Mach number was set to 1.2, the angle of attack (α+dα) at this time was set to 4.4 degrees, and the flight altitude was set to 35 kft as the conditions at the off-design Mach number. Due to its low flight altitude, the booms do not reach the ground at the off-track angle of 30 degrees. Therefore, an off-track angle of 20 degrees or less is taken into consideration.

Figure 28:
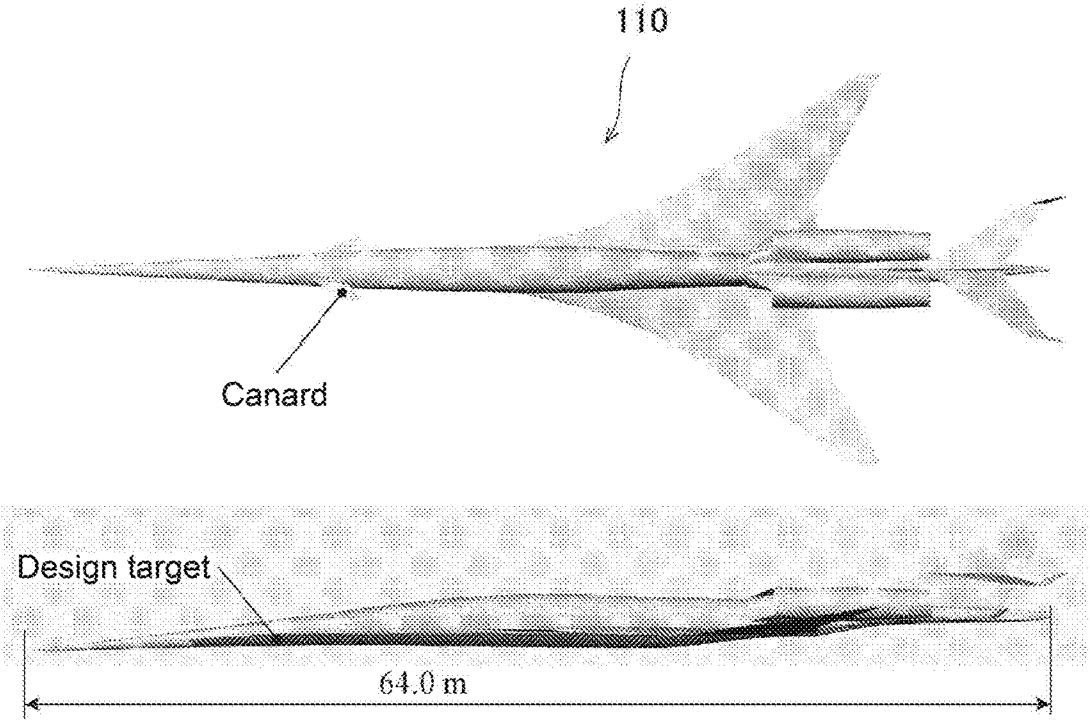
FIG. 28 A plan view (top) and a side view (bottom) showing an aircraft shape and a design target in Example 2 according to the present invention.

The lower side of FIG. 28 shows an aircraft shape (initial shape) and a design target site. As for a front sonic boom loudness evaluation method, as shown in FIG. 16, the boom loudness is evaluated with signatures whose rear sonic boom signatures are obtained by inverting front sonic boom signatures point-symmetrically as in the first embodiment.

Figure 29:
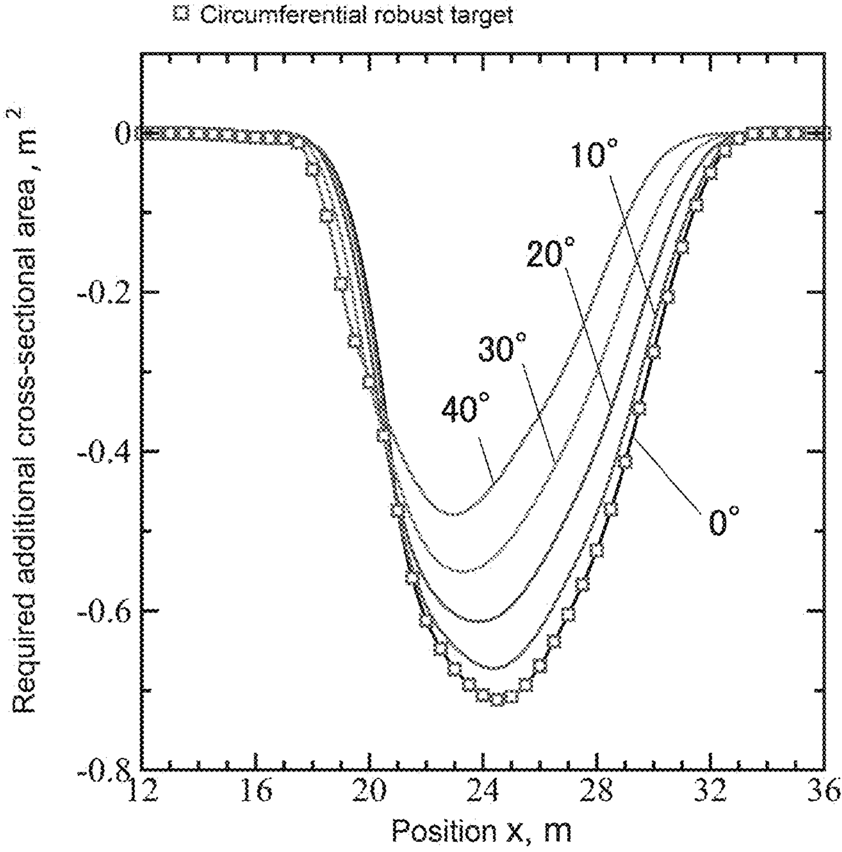
FIG. 29 A graph showing a required additional cross-sectional area distribution (circumferential robust) at a plurality of off-track angles described in Example 2 according to the present invention.
Figure 30:
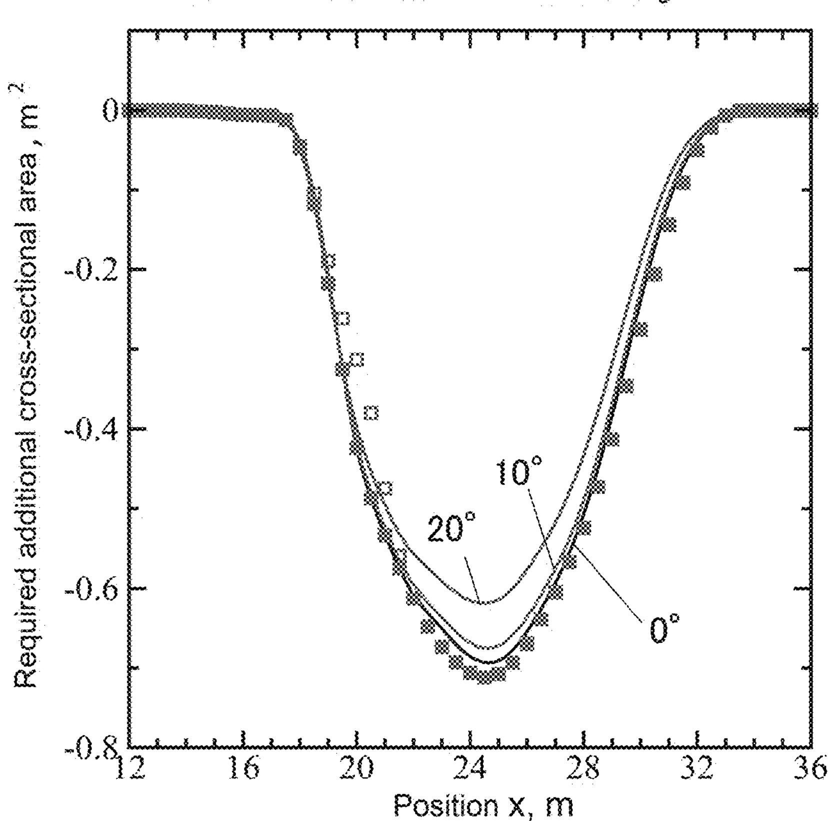
FIG. 30 A graph showing a required additional cross-sectional area distribution (Mach number and circumferential robust) at the plurality of off-track angles described in Example 2 according to the present invention.

FIGS. 29 and 30 show required additional cross-sectional area distributions obtained by applying the "conversion" from the off-track Mach plane at the off-design Mach number to the on-track Mach plane at the design Mach number. The distributions shown in these figures are examples, and different distributions can be taken depending on the shape, size, and position of the canards.

FIG. 29 shows distributions in a case of considering only the design Mach number. These distributions correspond to distributions to which the method according to the first embodiment is applied. In the figure, the required additional cross-sectional area distributions at five off-track angles of 0 degrees, 10 degrees, 20 degrees, 30 degrees, and 40 degrees all have negative values, which reduces the cross-sectional area of the aircraft (fuselage). Expansion waves, which are generated due to the reduction of the cross-sectional area, weaken the shock waves generated by the canards, which reduces the front sonic boom loudness. Here, in order to generate expansion waves required at all off-track angles, a distribution (white square plots) having the minimum value at each x position was set for the required additional cross-sectional area distributions at the five off-track angles. This distribution will be referred to as a circumferential robust target distribution and a shape designed based on this circumferential robust target distribution will be referred to as a circumferential robust shape.

On the other hand, FIG. 30 shows required additional cross-sectional area distributions to which the "conversion" is applied in consideration of the off-design Mach number. Here, required additional cross-sectional area distributions at three off-track angles of 0 degrees, 10 degrees, and 20 degrees at which sonic booms can propagate to the ground were studied based on the off-design Mach number (Mach 1.2) and an altitude at which the Mach number is reached (see FIG. 25). Then, a distribution (black square plots) having the minimum value at each x position was set for four distributions of the distributions at the three off-track angles and the above-mentioned circumferential robust target distribution. This distribution will be referred to as a Mach number and circumferential robust target distribution and a shape designed based on this Mach number and circumferential robust target distribution will be referred to as a Mach number and circumferential robust shape.

Note that the Mach number and circumferential robust target distribution is the same as the circumferential robust target distribution in the rear part (x>22 m).

Moreover, in this example, the required cross-sectional area distribution having the minimum value at each x position has been adopted for the four distributions in the application of the "conversion", though not limited thereto. It can be arbitrarily set depending on required boom loudness, design specifications, and the like.

Figure 31:
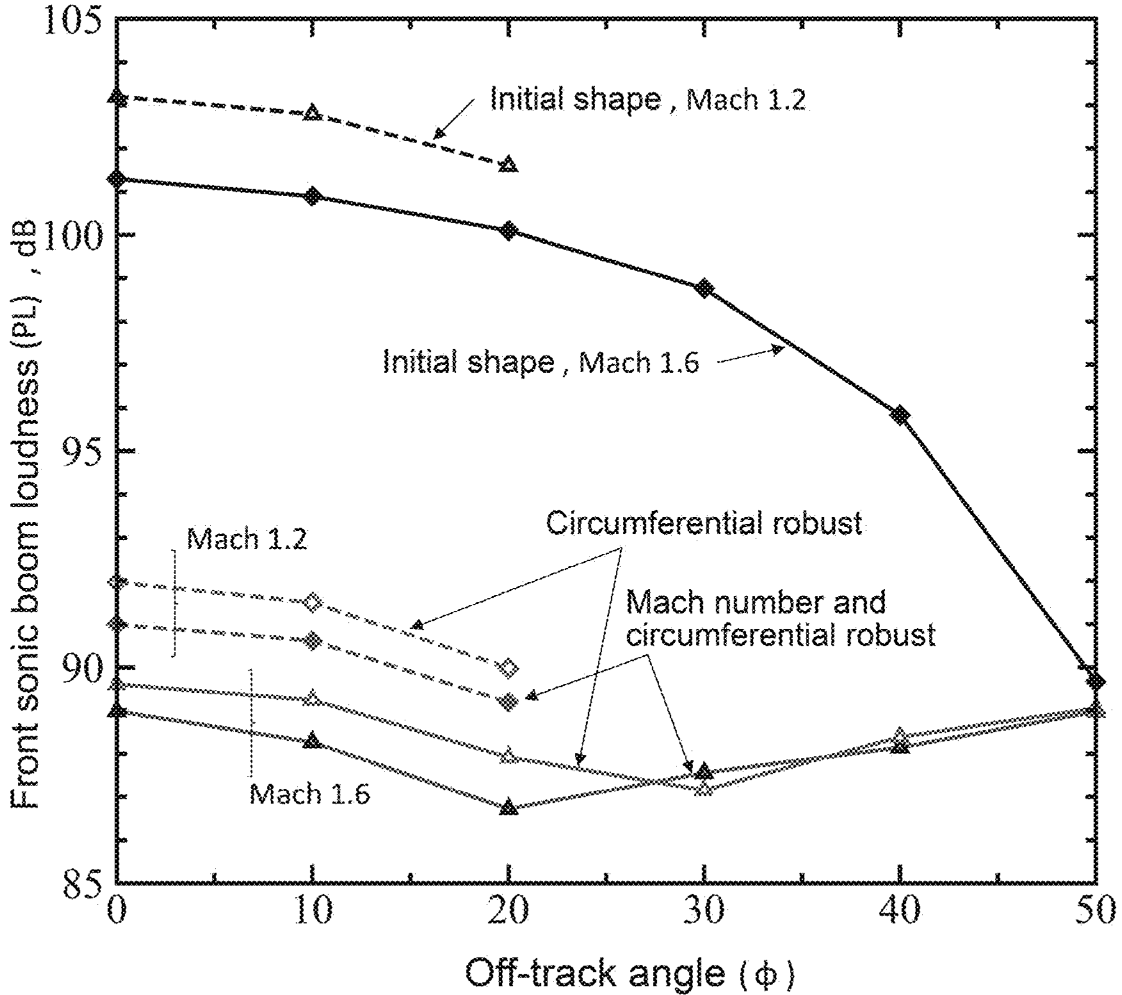
FIG. 31 A diagram describing the Mach number and circumferential robust in Example 2 according to the present invention.

The front sonic boom loudness with these shapes is shown in FIG. 31. Note that as to the boom loudness, the reflection coefficient on the ground was set to 1.9 and Stevens Perceived Level Mark VII (PL) was used as an evaluation tool.

As shown in FIG. 31, the boom loudness is reduced at both of Mach 1.6 and Mach 1.2 with the circumferential robust shape as compared to the initial shape. With the Mach number and circumferential robust shape, the maximum value of the boom loudness at Mach 1.6 is substantially the same as the circumferential robust shape. At Mach 1.2, the boom loudness is reduced with the Mach number and circumferential robust shape by about 1 dB as compared to the circumferential robust shape. That is, as compared to the method according to the first embodiment, the boom loudness at the off-design Mach number can be reduced while maintaining the boom loudness at the design Mach number in this embodiment.

<Supplements>

The present invention is not limited to the above-mentioned embodiments, various variants or modifications can be made within the scope of the technical concepts and these variants or modifications also fall within the technical scope of the present invention.

Moreover, the shape of the aircraft of the supersonic aircraft based on the method of designing the present invention provides a remarkable sonic boom reduction effect, and is different and distinguishable from the conventional shapes in this point. That is, the shape of the aircraft is a novel shape that has not ever existed, and an effect in which the shape can be obtained in a simple design process and sonic booms can be reduced is provided.

REFERENCE SIGNS LIST

10, 110 aircraft

111 required additional cross-sectional area distribution at off-track position

112 required additional cross-sectional area distribution at on-track position

The invention claimed is:

1. A method of producing a supersonic aircraft, the method comprising:

a) designing an aircraft shape of the supersonic aircraft by performing the following steps:

calculating an equivalent cross-sectional area distribution, which is a distribution of an equivalent cross-sectional area at a position in an airflow, of an initial shape of the supersonic aircraft at an off-track position;

calculating a target equivalent cross-sectional area distribution, which is a distribution of a target equivalent cross-sectional area in the airflow, at the off-track position of the supersonic aircraft for reducing sonic booms on a basis of the equivalent cross-sectional area distribution;

calculating a required additional cross-sectional area distribution that is a difference between the equivalent cross-sectional area distribution and the target equivalent cross-sectional area distribution;

calculating, on the basis of the required additional cross-sectional area distribution, a first required additional cross-sectional area and a second required additional cross-sectional area, wherein the first required additional cross-sectional area is a required additional cross-sectional area of a cross-section of the supersonic aircraft on an off-track Mach plane that is a Mach plane at the off-track position, where the cross-sectional shape for calculating the equivalent cross-sectional area of the supersonic aircraft is asymmetric, that extends through an arbitrary position in the airflow direction, wherein the second required additional cross-sectional area is a required additional cross-sectional area of a cross-section of the supersonic aircraft on an on-track Mach plane that is a Mach plane at an on-track position, where the cross-sectional shape for calculating the equivalent cross-sectional area of the supersonic aircraft is symmetric, that is located near the off-track Mach plane;

converting the first required additional cross-sectional area into the second required additional cross-sectional area; and adding the first required additional cross-sectional area, which is converted to the second required additional cross-sectional area, to the equivalent cross-sectional area distribution of the initial shape of the supersonic aircraft; and b) manufacturing the supersonic aircraft having the aircraft shape based on a result of the designing of the aircraft shape.

2. The method of producing a supersonic aircraft according to claim 1, wherein a blend ratio of a third distribution that blends a first required additional cross-sectional area distribution for reducing sonic booms at the off-track position and a second required additional cross-sectional area distribution for reducing on-track sonic booms is changed, on-track sonic boom loudness and off-track sonic boom loudness are evaluated for each blend ratio, and the blend ratio is set on a basis of a result of an evaluation of the on-track sonic boom loudness and the off-track sonic boom loudness.

3. The method of producing a supersonic aircraft according to claim 1, wherein the aircraft has a nose tip, an axis extending from a starting point that is the nose tip of the aircraft, which is an axis tilted by an arbitrary angle with respect to the airflow direction so as to be in proximity to a design target site, is set as a reference line, and the on-track Mach plane of the aircraft located near the off-track Mach plane is set as the on-track Mach plane that extends through an intersection point of the off-track Mach plane and the reference line.

4. The method of producing a supersonic aircraft according to claim 1, wherein the step of converting the first required additional cross-sectional area into the second required additional cross-sectional area includes converting the first required additional cross-sectional area at a design Mach number into the second required additional cross-sectional area at a design Mach number.

5. The method of producing a supersonic aircraft according to claim 1, wherein the step of converting the first required additional cross-sectional area into the second required additional cross-sectional area includes converting the first required additional cross-sectional area at an off-design Mach number into the second required additional cross-sectional area at a design Mach number.

6. The method of producing a supersonic aircraft according to claim 3, wherein the reference line is an aircraft axis.

7. The method of producing a supersonic aircraft according to claim 5, wherein the aircraft has a nose tip, an axis extending from a starting point that is the nose tip of the aircraft, which is an axis tilted by an arbitrary angle with respect to the airflow direction so as to be in proximity to a design target site, is set as a reference line, an intersection point of the off-track Mach plane at the off-design Mach number and the reference line at the off-design Mach number is calculated, the intersection point is rotated to be on the reference line at the design Mach number, using the nose tip as a center, and the on-track Mach plane at the design Mach number that extends through the rotated intersection point is set.

8. The method of producing a supersonic aircraft according to claim 7, wherein provided that the airflow direction is denoted by x, an x position on the off-track Mach plane at the off-design Mach number is denoted by X, a direction perpendicular to the airflow is denoted by z, an angle formed by the airflow direction and a direction of the reference line is denoted by α, an angle of rotation of the intersection point is denoted by dα, an x position on the on-track Mach plane at the design Mach number that extends through the rotated intersection point is denoted by X', the off-design Mach number is denoted by $M_{off}$, an off-track angle is denoted by φ ((0 degrees≤φ≤50 degrees), and $\beta_{off}=\sqrt{(M^2_{off}-1)}$ is established, the following relations are satisfied:

$$X = x + \beta_{off} \cdot z \cdot \cos\varphi;$$

$$\beta_{off} = \sqrt{(M_{off}^2 - 1)}; \text{ and}$$

$$z = -\tan(\alpha + d\alpha) \cdot x.$$

9. A supersonic aircraft, comprising:

a fuselage;

a pair of main wings on the fuselage;

a pair of engine nacelles on the fuselage; and a pair of horizontal tails on the fuselage, wherein the supersonic aircraft has a shape of an aircraft, for which:

an equivalent cross-sectional area distribution that is a distribution of an equivalent cross-sectional area at a position in an airflow of an initial shape at an off-track position of an aircraft is obtained;

a target equivalent cross-sectional area distribution that is a distribution of a target equivalent cross-sectional area in the airflow at the off-track position of the aircraft for reducing sonic booms is set on a basis of the equivalent cross-sectional area distribution; and on a basis of a required additional cross-sectional area distribution that is a difference between the equivalent cross-sectional area distribution and the target equivalent cross-sectional area distribution, a first required additional cross-sectional area of a cross-section of the aircraft on an off-track Mach plane that extends through an arbitrary position in an airflow direction is converted into a second required additional cross-sectional area of a cross-section of the aircraft on an on-track Mach plane that is located near the off-track Mach plane and the required additional cross-sectional area of the cross-section of the aircraft on the on-track Mach plane is added.

10. The supersonic aircraft according to claim 9, wherein for the shape of the aircraft, a blend ratio of a third distribution that blends a first required additional cross-sectional area distribution for reducing sonic booms at the off-track position and a second required additional cross-sectional area distribution for reducing on-track sonic booms is changed, on-track sonic boom loudness and off-track sonic boom loudness are evaluated for each blend ratio, and the blend ratio is set on a basis of a result of the evaluation.

* * * * *